United States Patent [19]

Ikemoto et al.

[11] Patent Number: 4,807,128

[45] Date of Patent: Feb. 21, 1989

[54] SYSTEM FOR VEHICLE BODY ROLL CONTROL DETECTING AND COMPENSATING FOR RAPID RATE OF CHANGE OF STEERING ANGLE AS DURING EMERGENCY STEERING

[75] Inventors: Hiroyuki Ikemoto; Nobutaka Owa, both of Toyota; Yasutaka Hayashi; Shunichi Doi, both of Aichi, all of Japan

[73] Assignee: Toyota Jidosha Kabushiki Kaisha, Toyota, Japan

[21] Appl. No.: 16,944

[22] Filed: Feb. 20, 1987

[30] Foreign Application Priority Data

Feb. 21, 1986 [JP] Japan ................................ 61-36705

[51] Int. Cl.$^4$ ............................................. B60G 11/26
[52] U.S. Cl. .............................. 364/424.05; 280/707; 280/6.12; 364/571.02
[58] Field of Search ....................... 364/424, 425, 571; 180/41; 280/707, 708, 689, 772, 6 H, 6 R, DIG. 1

[56] References Cited

U.S. PATENT DOCUMENTS

| | | | |
|---|---|---|---|
| 4,564,214 | 1/1986 | Tokunaga et al. | 280/708 |
| 4,605,244 | 8/1986 | Tanaka et al. | 280/707 |
| 4,621,832 | 11/1986 | Nakashima et al. | 364/424 |
| 4,624,476 | 11/1986 | Tanaka et al. | 280/707 |
| 4,625,993 | 12/1986 | Williams et al. | 280/6 H |
| 4,693,493 | 9/1987 | Ikemoto et al. | 280/689 |
| 4,697,237 | 9/1987 | Tanaka et al. | 280/6 H |

FOREIGN PATENT DOCUMENTS 0143984 12/1985 European Pat. Off. .
2079701 1/1982 United Kingdom .
2158018 11/1985 United Kingdom .

Primary Examiner—Gary Chin
Attorney, Agent, or Firm—Oblon, Fisher, Spivak, McClelland & Maier

[57] ABSTRACT

In this system for vehicle roll control, one actuator assembly is provided corresponding to each vehicle wheel and resiliently suspends it from the vehicle body. Each of these actuator assemblies is adapted to increase or decrease the vehicle height at its vehicle wheel as a result of a control signal being supplied. Control means are provided corresponding to the actuator assemblies and serve to supply control signals to them. A vehicle speed detecting means senses road speed, a steering angle detecting means senses steering angle, a means senses the rate of change of steering angle, and a means detects the actual roll angle $\phi_t$ of the vehicle body. A computing and control means computes a steady state roll angle $\phi_\infty$ of the vehicle body from the vehicle speed and the steering angle, advances the phase of a signal representative of the steady state roll angle $\phi_\infty$ to thereby compute a compensating value $\Phi_\infty$ of roll angle, computes an amendment value $\phi_x$ of roll angle in accordance with the rate of change of steering angle, computes the difference $\hat{\phi}$ based upon the desired roll angle $\phi_a$ of the vehicle body, the compensating value $\Phi_\infty$, the amendment value $\phi_x$, and the actual roll angle $\phi_t$ following the equation: $\hat{\phi} = \phi_a - (k_1 \Phi_\infty + k_2 \Phi t + k_3 \Phi x)$, where k1, k2 and k3 are positive constants; and controls the actuator assemblies, via the control means, in accordance with the difference $\hat{\phi}$, when the absolute value of the difference $\hat{\phi}$ is larger than a predetermined value.

14 Claims, 8 Drawing Sheets

SYSTEM FOR VEHICLE BODY ROLL CONTROL DETECTING AND COMPENSATING FOR RAPID RATE OF CHANGE OF STEERING ANGLE AS DURING EMERGENCY STEERING

BACKGROUND OF THE INVENTION

The present invention relates to a roll control system for an automotive vehicle, and more specifically relates to a vehicle roll control system of the vehicle height adjustment type.

The present invention has been described in Japanese Patent Application Ser. No. Showa 61-036705 (1986), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attract the attention of the examining authorities to copending Patent Applications Ser. Nos. 06/921,138; 06/921,251; 06/921,450; 06/921,451; 06/921,468; 07/017,592; and 07/026,468, which may be considered to be material to the examination of the present patent application.

In general, in the operational conditions where a vehicle such as an automobile turns at a speed not less than a particular determinate turning speed value, the body of the vehicle experiences rolling, i.e. the vehicle body inclines in the radially outward direction, and this rolling results in deterioration of the drivability of the vehicle.

In order to cope with the above problem—as described in the specifications of, for example, Japanese Patent Applications Serial Nos. Sho 60-235659, Sho 60-235660, and Sho 60-235661, which are applications filed by at least one applicant the same as the entity assigned or owed duty of assignment of the present patent application, and the subject matters of some or all of which are included in the above identified Patent Applications which are copending with the present Patent Application as described above, but which it is not hereby intended to admit in any way as prior art to the present application except to the extent in any case mandated by applicable law—there have been proposed to fit to a vehicle various types of vehicle height adjustment systems comprising: a plurality of actuators which are provided for resiliently suspending the vehicle wheels from its body and are adapted to increase or decrease vehicle height at locations corresponding to the associated vehicle wheels as respective results of supplying or discharging working fluid to or from variable volume working fluid chambers of said actuators; a plurality of working fluid supplying and discharging means which are provided corresponding to the actuators and which serve to supply or discharge the working fluid to or from said actuators; a vehicle speed detecting means for detecting the road speed of the vehicle; a steering angle detecting means for detecting the steering angle of the vehicle; and a control means for controlling the working fluid supplying and discharging means by predictingly computing the roll angle of the vehicle body based upon the vehicle speed and the steering angle as sensed by these detecting means therefor, and for in accordance with this predicted roll angle reducing the rolling of the vehicle body so as thus previously and predictingly to keep said vehicle body roll within a predetermined range. Also there have been proposed to fit similar vehicle height adjustment systems, in which the differences between the actual vehicle heights at its various wheels and certain reference vehicle heights are reduced to be within predetermined ranges, again so as thereby similarly previously and positively to prevent the vehicle body from rolling.

In a vehicle equipped with such a vehicle height adjustment system as described above, however, when it should happen that the steering wheel of the vehicle is turned more quickly than in the case of normal steering action when directing the vehicle around a curve or corner—as for example is done when emergency steering action is being taken for causing said vehicle to avoid an obstacle or the like—then the speed of response of the vehicle roll control system is not always sufficiently high to definitely prevent the rolling of the vehicle body positively and precisely. In such a case, the drivability and the controllability and the comfortability of the vehicle are deteriorated, and the cornering and the road holding characteristics thereof may also suffer.

SUMMARY OF THE INVENTION

The present invention considers the problem described above which arises in roll control through the use of such vehicle height adjustment systems as outlined above, and has as its primary object to avoid the problem detailed above.

Another object of the present invention is the provision of an improved vehicle roll control system of vehicle height adjustment type which provides good control of the roll angle of the vehicle body, even in the case when the steering wheel of the vehicle is rotated for steering action more quickly than is the usual case.

Another object of the present invention is the provision of an improved vehicle roll control system of vehicle height adjustment type, in which the roll angle of the vehicle body is restricted by adjusting the height of the vehicle body at locations corresponding to its wheels within reference vehicle body height ranges, even in such a case that the steering wheel of the vehicle is rotated for steering action more quickly than is the usual case.

Another object of the present invention is the provision of an improved vehicle roll control system of vehicle height adjustment type which is adapted to predict a roll angle of the vehicle body from the vehicle speed and the steering angle, and to control the working fluid supplying and discharging means according to the predicted roll angle, thereby to prevent previously and positively the vehicle body from rolling even in the case when emergency steering action is being performed to avoid an obstacle.

Another object of the present invention is to provide a vehicle roll control system which has, in addition to the above functions, the function of properly adjusting the vehicle height within a desired vehicle height range in the case where the vehicle is not suffering from operational conditions that cause rolling of the vehicle body to an extent greater than a determinate extent.

Yet another object of the present invention is to provide a vehicle roll control system which provides improved drivability for the vehicle to which it is fitted.

Yet another object of the present invention is to provide a vehicle roll control system which provides improved controllability for the vehicle to which it is fitted.

Yet another object of the present invention is to provide a vehicle roll control system which provides improved comfortability for the vehicle to which it is fitted.

Yet another object of the present invention is to provide a vehicle roll control system which provides improved cornering and the road holding characteristics for the vehicle to which it is fitted.

According to a first general aspect of the present invention, these and other objects are attained by, for a vehicle comprising a body and a plurality of wheels upon which said vehicle runs, a vehicle roll control system of vehicle height adjustment type, comprising: a plurality of actuator assemblies, one provided corresponding to each one of said vehicle wheels and resiliently suspending said one of said vehicle wheels from the vehicle body, each of said actuator assemblies being adapted to increase or decrease vehicle height at a location corresponding to its corresponding vehicle wheel as results of control signals being supplied thereto; a plurality of control means which are provided corresponding to said actuator assemblies and which serve to supply control signals to said actuator assemblies; a vehicle speed detecting means for sensing the road speed of the vehicle; a steering angle detecting means for sensing the steering angle of the vehicle; a steering angle rate of change detecting means for detecting the rate of change of said steering angle of the vehicle; a means for detecting the actual roll angle $\phi_t$ of the body of the vehicle; and: a means for computing and control, which: computes a steady state roll angle $\phi_\infty$ of the vehicle body based upon the vehicle speed sensed by said vehicle speed detecting means and the steering angle sensed by said steering angle detecting means; advances the phase of a signal representative of said steady state roll angle $\phi_\infty$ to thereby compute a compensating value $\phi_\infty$ of roll angle; computes an amendment value $\phi_x$ of roll angle in accordance with the rate of change of steering angle as determined by said steering angle rate of change detecting means; computes the difference $\hat{\phi}$ based upon the desired roll angle $\phi_a$ of said vehicle body, said compensating value $\phi_\infty$, said amendment value $\phi_x$, said said actual roll angle $\phi_t$ following the equation: $\hat{\phi} = \phi_a - (k_1 \Phi_\infty + k_2 \phi_t + k_3 \phi_x)$, wherein k1, k2 and k3 are positive constants; and controls said plurality of actuator assemblies, via said plurality of control means, in accordance with said difference $\hat{\phi}$, when the absolute value of said difference $\hat{\phi}$ is larger than a predetermined value; and, according to a second general aspect of the present invention, these and other objects are attained by, for a vehicle comprising a body and a plurality of wheels upon which said vehicle runs, a vehicle roll control system of vehicle height adjustment type, comprising: a plurality of actuator assemblies, one provided corresponding to each one of said vehicle wheels and resiliently suspending said one of said vehicle wheels from the vehicle body, each of said actuator assemblies being adapted to increase or decrease vehicle height at a location corresponding to its corresponding vehicle wheel as results of control signals being supplied thereto; a plurality of control means which are provided corresponding to said actuator assemblies and which serve to supply control signals to said actuator assemblies; a plurality of vehicle height detecting means which are provided corresponding to said vehicle wheels and which serve for sensing parameters Hi representative of the heights of the vehicle body over said vehicle wheels; a vehicle speed detecting means for sensing the road speed of the vehicle; a steering angle detecting means for sensing the steering angle of the vehicle; a steering angle rate of change detecting means for detecting the rate of change of said steering angle of the vehicle; a means for detecting the actual roll angle $\phi_t$ of the body of the vehicle; and: a means for computing and control, which: computes the differences $\Delta$Hi between the actual vehicle wheel heights over said vehicle wheels as sensed by said plurality of vehicle height detecting means and reference vehicle heights; computes a steady state roll angle $\phi_\infty$ of the vehicle body based upon the vehicle speed sensed by said vehicle speed detecting means and the steering angle sensed by said steering angle detecting means; advances the phase of a signal representative of said steady state roll angle $\phi_\infty$ to thereby compute a compensating value $\phi_\infty$ of roll angle; computes an amendment value $\phi_x$ of roll angle in accordance with the rate of change of steering angle as determined by said steering angle rate of change detecting means; computes the difference $\hat{\phi}$ based upon the desired roll angle $\phi_a$ of said vehicle body, said compensating value $\phi_\infty$, said amendment value $\phi_x$, and said actual roll angle $\phi_t$ following the equation: $\hat{\phi} = \phi_a - (k_1 \Phi_\infty + k_2 \phi_t + k_3 \Phi_x)$, where k1, k2 and k3 are positive constants; and, when the absolute value of said difference $\hat{\phi}$ is larger than a predetermined value, controls said plurality of actuator assemblies, via said plurality of control means, in accordance with said difference $\hat{\phi}$; while said computing and control means, when the absolute value of said difference $\hat{\phi}$ is less than said predetermined value, controls said plurality of actuator assemblies, via said plurality of control means, in accordance with said vehicle height differences $\Delta$Hi, so as to keep said vehicle height differences $\Delta$Hi within determinate ranges.

According to the first one of the systems just specified above, the computing and control means is adapted to compute the steady state roll angle $\phi_\infty$ from the vehicle speed and the steering angle, to advance the phase of a signal representative of said steady state roll angle $\phi_\infty$ to thereby compute a compensating value $\phi_\infty$ of roll angle, to compute an amendment value $\phi_x$ of roll angle in accordance with the rate of change of steering angle, to compute the difference $\hat{\phi}$ based upon the desired roll angle $\phi_a$ of said vehicle body, said compensating value $\phi_\infty$, said amending value $\phi_x$, and said actual roll angle $\phi_t$ following the equation: $\hat{\phi} = \phi_a - (k_1 \Phi_\infty + k_2 \phi_t + k_3 \Phi_x)$, where k1, k2, and k3 are positive constants, and to control said plurality of actuator assemblies, via said plurality of control means, in accordance with said difference $\hat{\phi}$, when the absolute value of said difference $\hat{\phi}$ is larger than a determinate value. Accordingly, it is possible thereby previously, precisely, and positively to prevent the vehicle body from rolling even during rapid steering such as emergency steering.

And, further, according to latter one of the two systems just specified above, the computing and control means is adapted to compute the steady state roll angle $\phi_\infty$ from the vehicle speed and the steering angle, to advance the phase of a signal representative of said steady state roll angle $\phi_\infty$ to thereby compute a compensating value $\phi_\infty$ of roll angle, to compute an amendment value $\phi_x$ of roll angle in accordance with the rate of change of steering angle, to compute the difference $\hat{\phi}$ based upon the desired roll angle $\phi_a$ of said vehicle body, said compensating value $\phi_\infty$, said amending value $\phi_x$, and said actual roll angle $\phi_t$ following the equation:

$\dot{\phi} = \phi_a - (k_1\phi_\infty + k_2\phi_t + k_3\phi_x)$, where k1, k2, and k3 are positive constants, to control said plurality of actuator assemblies, when the absolute value of said difference $\dot{\phi}$ is larger than a predetermined value, via said plurality of control means, in accordance with said difference $\dot{\phi}$; and, when the absolute value of said difference $\dot{\phi}$ is less than said predetermined value, to control said plurality of actuator assemblies, via said plurality of control means, in accordance with said vehicle height differences $\Delta Hi$, so as to keep said vehicle height differences $\Delta Hi$ within determinate ranges. Accordingly, it is possible thereby to adjust the vehicle height within a desired vehicle height range when the vehicle is under the stationary or the substantially straight ahead operating condition; and, when the vehicle turns, since said plurality of actuator assemblies are controlled, via said plurality of control means, at rates in accordance with the predicted and phase advanced roll angle $\phi_\infty$, the desired roll angle $\phi_a$ of the vehicle body, the amendment value $\phi_x$ of roll angle, and the actual roll angle $\phi_t$, disregarding whether or not any vehicle height difference or rolling of the vehicle body have actually occurred, it is possible therefore previously, precisely, and positively to prevent the vehicle body from rolling even during rapid steering such as emergency steering.

And, according to a detailed characteristic of the present invention, in either of the two constructions specified above, said computing and control means may comprise a memory means, and said memory means may store the relationship between vehicle speeds, steering angles, and steady state vehicle body rolling angles.

Further, according to yet another detailed characteristic of the present invention, in either of the two constructions initially specified above, the said rate of change of said steering angle of the vehicle may be steering velocity, and said steering angle rate of change detecting means may comprise said steering angle detecting means and a computing means for time differentiating the steering angle as sensed by said steering angle detecting means to thereby compute a steering velocity. Alternatively, according to an alternative detailed characteristic of the present invention, in either of the two constructions initially specified above, said rate of change of said steering angle of the vehicle may be steering angular velocity, and said steering angle rate of change detecting means may comprise a means for sensing steering angular velocity.

Further, according to yet another detailed characteristic of the present invention, in the first one of the two constructions initially specified above said means for detecting the actual roll angle of said vehicle body may comprise a plurality of vehicle height detecting means which are provided corresponding to said vehicle wheels and which serve for sensing parameters representative of the heights of the vehicle body over said vehicle wheels, said computing and control means being adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle $\phi_t$ the average of these two roll angles $\phi_f$ and $\phi_r$.

And, yet further, according to yet another detailed characteristic of the present invention, in the second one of the two constructions initially specified above, said means for detecting the actual roll angle of said vehicle body may comprise said plurality of vehicle height detecting means, said computing and control means being adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle $\phi_t$ the average of these two roll angles $\phi_f$ and $\phi_r$.

Further, according to yet another detailed characteristic of the present invention, in either one of the two constructions proximately specified above, said computing and control means may be adapted to perform the controlling of the hardness and the softness characteristics of the suspension means individually for the case of the front vehicle wheels and for the case of the rear vehicle wheels, based upon said two roll angles $\phi_f$ and $\phi_r$.

Finally, according to yet another detailed characteristic of the present invention, in either of the constructions specified above, said computing and control means may be adapted to consider said amendment value $\phi_x$ as zero when said rate of change of the steering angle of the vehicle is less than a predetermined value.

THEORETICAL BACKGROUND

Next, the principles of the roll control according to various aspects of the present invention will be described, prior to the description of the preferred embodiment of the present invention.

First, the movement of a vehicle can be expressed in the following movement equations with respect to the three movements, i.e. the lateral translation w, the yaw movement r, and the rolling movement $\phi$:

$$\Sigma M\dot{u} = \Sigma M(-Vr + g\phi) + \sum_{i=1}^{4} Fsi \quad (1)$$

$$\Sigma Iz\dot{r} = \Sigma N\psi \quad (2)$$

$$Ix\ddot{\phi} = 2(MufZf + MurZr)(\dot{u} + Vr - g\phi) + \Sigma N\phi \quad (3)$$

where:
$\Sigma M$ is the total weight of the vehicle;
Muf is the sprung mass for the front wheels;
Mur is the sprung mass for the rear wheels;
Zf is the vertical distance from the center of gravity of the vehicle to the rotational axis of the front wheels;
Zr is the vertical distance from the center of gravity of the vehicle to the rotational axis of the rear wheels;
V is the vehicle speed;
Fsi is the side force;
r is the yaw rate;
$\phi$ is the roll angle;
Iz is the yaw moment of inertia;
Ix is the roll moment of inertia;
$N\psi$ is the yaw moment;
$N\phi$ is the roll moment;
g is the acceleration due to gravity; and u is the lateral translation speed.

Further, from the equations (1) through (3), a steady state movement of the vehicle is assumed with respect to the case where the vehicle speed is V and the steering angle is δ. The steady state movement of a simple vehicle model is expressed in the following equations with respect to the lateral translation, the yaw movement, and the rolling movement:

$$\Sigma M V r + 2C_{sf}\frac{u + A_f \cdot r}{V} + 2C_{sr}\frac{u - A_r \cdot r}{V} = 2C_{sf}\delta \quad (1')$$

$$2A_fC_{sf}\frac{u + A_f \cdot r}{V} - 2A_rC_{sr}\frac{u - A_r \cdot r}{V} = 2A_fC_{sf}\delta \quad (2')$$

$$2Z_fC_{sf}\frac{u + A_f \cdot r}{V} + 2Z_rC_{sr}\frac{u - A_r \cdot r}{V} + K\phi = 2Z_fC_{sf}\delta \quad (3')$$

where:

$$K = \frac{T_f}{2}\left(K_fT_f + 2\frac{R_f}{T_f}\right) + \frac{T_r}{2}\left(K_rT_r + 2\frac{R_r}{T_r}\right)$$

$C_{sf}$ is the cornering power in the front wheels;
$C_{sr}$ is the cornering power in the rear wheels;
$A_f$ is the horizontal distance from the center of gravity of the vehicle to the rotational axis of the front wheels;
$A_r$ is the horizontal distance from the center of gravity of the vehicle to the rotational axis of the rear wheels;
$T_f$ is the tread of the front wheels;
$T_r$ is the tread of the rear wheels;
$R_f$ is the rigidity of the stabilizer for the front wheels;
$R_r$ is the rigidity of the stabilizer for the rear wheels;
$K_f$ is the spring rate of the suspension springs for the front wheels; and
$K_r$ is the spring rate of the suspension springs for the rear wheels;

Using vehicle speed V and steering angle δ, the above equations (1') through (3') can be rewritten as follows:

$$2\frac{C_{sf} + C_{sr}}{V} \cdot u + \frac{\Sigma M \cdot V^2 + 2(A_fC_{sf} - A_rC_{sr})}{V} \cdot r = 2C_{sf}\delta \quad (4)$$

$$2\frac{A_fC_{sf} - A_rC_{sr}}{V} \cdot u + 2\frac{A_f^2C_{sf} + A_r^2C_{sr}}{V} \cdot r = 2A_fC_{sf}\delta \quad (5)$$

$$2\frac{Z_fC_{sf} + Z_rC_{sr}}{V} \cdot u + 2\frac{A_fZ_fC_{sf} - A_rZ_rC_{sr}}{V} \cdot r + \quad (6)$$

$$K\phi = 2Z_rC_{sf}\delta$$

The above equations (4) through (6) can be expressed in matrix form as follows:

$$\begin{pmatrix} a_{11} & a_{12} & 0 \\ a_{21} & a_{22} & 0 \\ a_{31} & a_{32} & a_{33} \end{pmatrix} \begin{pmatrix} u \\ r \\ \phi \end{pmatrix} = \begin{pmatrix} b_1 \\ b_2 \\ b_3 \end{pmatrix} \quad (7)$$

$$D = \begin{pmatrix} a_{11} & a_{12} & 0 \\ a_{21} & a_{22} & 0 \\ a_{31} & a_{32} & a_{33} \end{pmatrix} \quad D_\infty = \begin{pmatrix} a_{11} & a_{12} & b_1 \\ a_{21} & a_{22} & b_2 \\ a_{31} & a_{32} & b_3 \end{pmatrix} \quad (8)$$

Now, by making replacement as follows and applying the Cramer's formula, a predicted steady state roll angle $\phi_\infty$ of the vehicle may be expressed as follows:

$$\phi_\infty = D_\infty / D \quad (9)$$

Thus, as shown in FIG. 5, from the relationship defined by the equation (9) a graph may be obtained which shows the relationship between the vehicle speed V, the steering angle δ, and the steady state roll angle $\phi_\infty$.

Also, as will be seen hereinafter, by predicting the steady state roll angle $\phi_\infty$ corresponding to the vehicle speed V and each instantaneous value of steering angle which varies gradually at each instantaneous vehicle speed V, by advancing the phase of a signal indicative of the steady state roll angle to thereby compute a compensating value $\Phi_\infty$ of roll angle, by computing an amendment value $\phi_x$ of roll angle corresponding to the rate of change ω of steering angle, and by computing the difference $\hat{\phi}$ based upon the desired roll angle $\phi_a$, the compensating value $\Phi_\infty$, the amendment value $\phi_x$ of roll angle, and the actual roll angle $\phi_t$ folowing the equation:

$$\hat{\phi} = \phi_a - (k_1\Phi_\infty + k_2\phi_t + k_3\phi_x)$$

where k1, k2, and k3 are positive constants, and, when the difference $\hat{\phi}$ is relatively large, by controlling the working fluid supplying and discharging means incorporated in the vehicle height adjustment system with a duty ratio which is determined according to the difference $\hat{\phi}$, it is possible to compensate for the time lag in roll control during the turning periods, particularly including during periods of emergency steering, as well as to perform accurate roll control, to thereby prevent previously, positively, and precisely the vehicle body from rolling.

Since the actual roll level of the vehicle body is relatively small when the difference $\hat{\phi}$ is relatively small, the hardness and softness characteristics of the suspension means—e.g. the damping force of the shock absorbers or the like, the spring rate of the suspension springs or the like, and so on—may be controlled in accordance with the difference $\hat{\phi}$, so as to reduce the rolling of the vehicle body while assuring good comfortability for the vehicle.

In this connection, when the absolute value of the roll angle difference is relatively large, by carrying out a calculation of the so called threshold filter type on the roll angle difference $\hat{\phi}$ following the equations:

$$\hat{\phi}_s = k_4(\hat{\phi} - \phi_1)(\hat{\phi} > \phi_1)$$

$$\hat{\phi}_s = k_5(\hat{\phi} + \phi_1)(\hat{\phi} < -\phi_1)$$

where k4 and k5 are positive coefficients, to determine a modified value $\hat{\phi}_s$ of the roll angle difference, and, in particular, when the absolute value of the difference $\hat{\phi}$ exceeds $\phi_1$, by controlling the suspension actuators according to the modified value $\phi_s$ of the roll angle difference, as will be described hereinbelow in detail, it is possible to reduce any rapid change in the rate of change of the actual roll angle of the vehicle body, during a transitional stage between the mode of roll control performed by controlling the hardness and softness characteristics of the suspension and the mode of roll control performed by controlling the suspension actuators according to height adjustment.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts in the various figures; and:

DESCRIPTION OF THE PREFERRED EMBODIMENT

Figure 1:
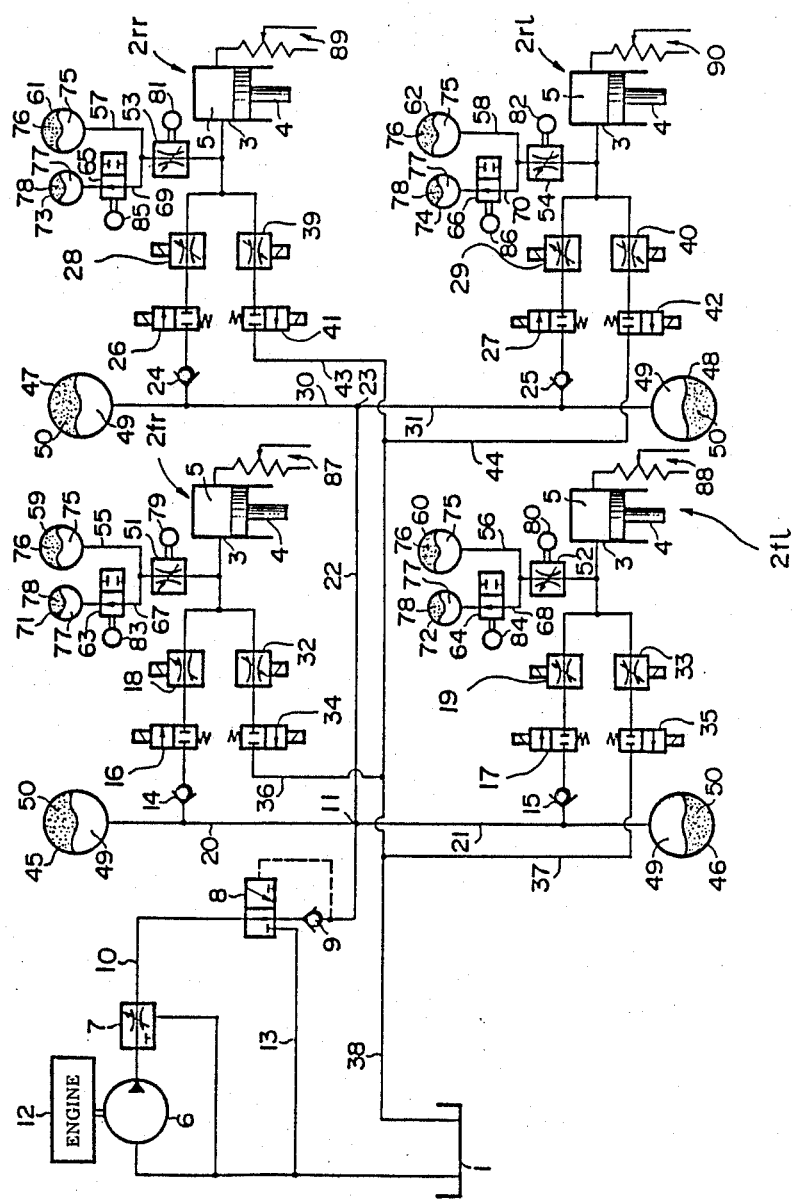
FIG. 1 is a schematic diagram showing major physical components of the preferred embodiment of the system for roll control for an automotive vehicle of the present invention.
Figure 2:
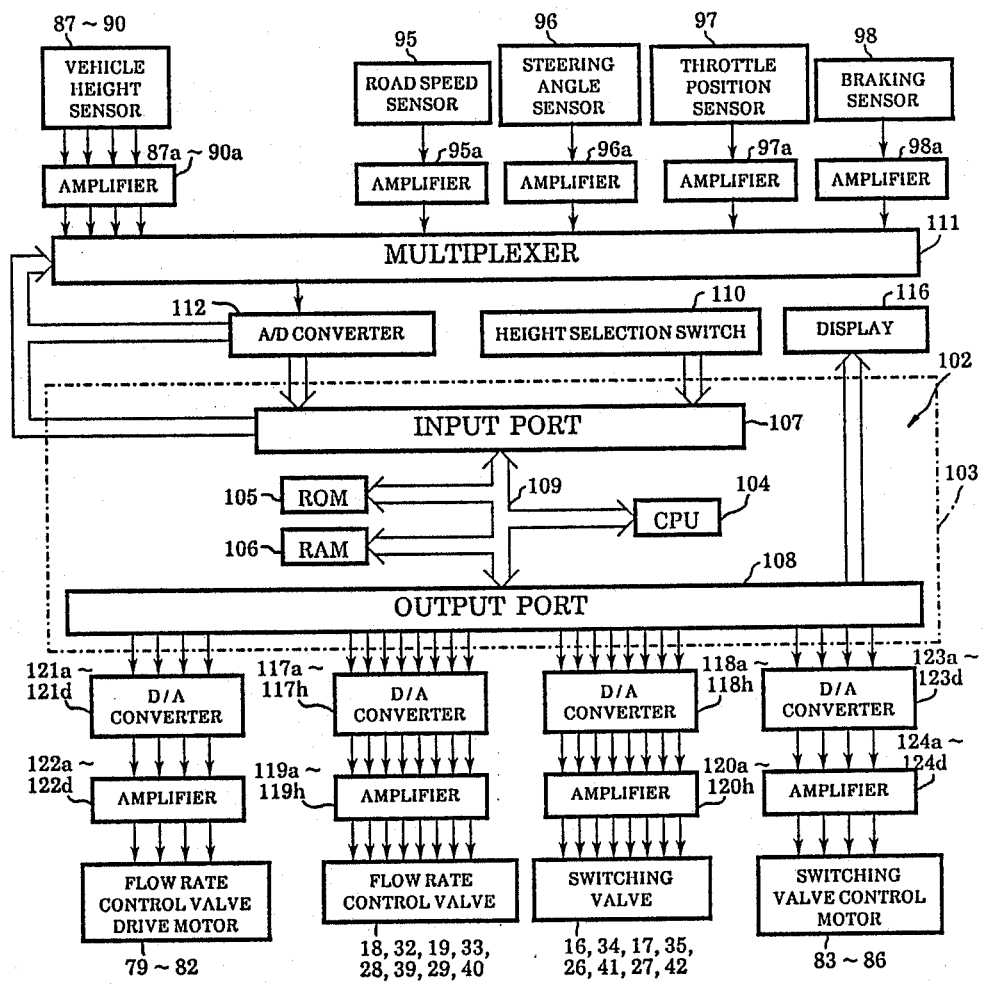
FIG. 2 is a block diagrammatical view showing the internal construction of an electrical control device, of a type incorporated in said preferred embodiment of the system for roll control for an automotive vehicle of the present invention, incorporating a micro computer.

The present invention will now be described with reference to the preferred embodiment thereof, and with reference to the figures. FIG. 1 is a schematic diagram showing major physical components of said preferred embodiment of the system for automotive vehicle roll control of the present invention, and FIG. 2 is a block diagrammatical view showing the internal construction of an electrical control device incorporating a micro computer, incorporated in said preferred embodiment.

OVERALL SUSPENSION SYSTEM CONSTRUCTION

Referring first to FIG. 1 which shows the gross mechanical components incorporated in the vehicle roll control system of the present invention that are utilized for vehicle height and ride adjustment, in this figure the reference numeral 1 denotes a suspension working fluid reservoir or sump, while 2fl, 2fr, 2rl, and 2rr are actuator assemblies which are provided to, respectively, the front left vehicle wheel, the front right vehicle wheel, the rear left vehicle wheel, and the rear right vehicle wheel; none of these vehicle wheels is particularly shown in any of the figures. And, in and for each of said actuator assemblies 2fl, 2fr, 2rl, and 2rr, the reference numeral 3 denotes a cylinder and the reference numeral 4 denotes a piston sliding in said cylinder and cooperating with a closed end thereof to define an actuating pressure chamber 5. Each of said vehicle wheels is rotationally mounted about a substantially horizontal axis (not shown) to a member such as a suspension arm (not shown either) or the like which is suspended from the body (also not shown) of the vehicle by means of a flexible linkage of some per se known sort, and each of said actuator assemblies 2fl, 2fr, 2rl, and 2rr is arranged to have one of its cylinder 3 and its piston 4 drivingly coupled to one of said vehicle body and said suspension arm, while the other of its said cylinder 3 and its said piston 4 is drivingly coupled to the other of said vehicle body and said suspension arm. Thus, by pressurization by suspension working fluid (abbreviated hereinafter in this specification merely as "fluid") of the pressure chamber 5 defined by said cylinder 3 and said piston 4, each of said actuator assemblies 2fl, 2fr, 2rl, and 2rr serves for maintaining and adjusting the sprung height from the road surface of the portion of the vehicle body above its associated vehicle wheel, and for determining the characteristics of the springing of its said associated vehicle wheel. In other possible embodiments of the vehicle roll control system of the present invention, other constructions, such as hydraulic ram apparatuses, would be possible for these actuator assemblies 2fl, 2fr, 2rl, and 2rr, as long as each was capable of increasing and decreasing the sprung height of the portion of the vehicle body above its associated vehicle wheel, corresponding to the supply and the discharge of fluid to a working fluid chamber thereof, or to some other controlling parameter, and as long as the pressure in the working fluid chamber (or the like) increased and decreased (or the like) in response respectively to bound and rebound of said associated vehicle wheel.

Fluid is sucked up from the reservoir 1 by a fluid pump 6 rotationally driven by the engine 12 of the vehicle to which this suspension system is fitted, and a pressurized supply thereof is fed via a conduit 10 through, in order, a flow rate control valve 7, a load mitigating valve 8, and a one way check valve 9 to a conduit junction point 11, and thence via another conduit 22 said pressurized fluid is fed to another conduit junction point 23. The flow rate control valve 7 is constructed so as to control the flow rate of fluid in the conduit 10 according to a signal which it receives. The load mitigating valve 8 is constructed so as to be responsive to the pressure in the conduit 10 downstream of the one way check valve 9 and so as to vent a certain amount of the pressurized fluid in said conduit 10 via a conduit 13 back to a point in said conduit 10 upstream of the pump 6, so as to maintain said pressure in the conduit 10 downstream of the one way check valve 9 at no more than a determinate pressure value. And the check valve 9 prevents the fluid from flowing backwards through the conduit 10 from the conduit junction points 11 and 23 towards the load mitigating valve 8.

The conduit junction point 11 is connected to the cylinder chamber 5 of the actuator 2fr for the front right vehicle wheel via a conduit 20 at intermediate points along which there are provided, in order, a one way check valve 14, an electrically controlled ON/OFF switching valve 16, and an electrically controlled flow rate control valve 18. Similarly, said conduit junction point 11 is connected to the cylinder chamber 5 of the actuator 2fl for the front left vehicle wheel via a conduit 21 at intermediate points along which there are provided, in order, a one way check valve 15, an electrically controlled ON/OFF switching valve 17, and an electrically controlled flow rate control valve 19. The other conduit junction point 23 is connected to the cylinder chamber 5 of the actuator 2rr for the rear right vehicle wheel via a conduit 30 at intermediate points along which there are provided, in order, a one way check valve 24, an electrically controlled ON/OFF switching valve 26, and an electrically controlled flow rate control valve 28. Similarly, said other conduit junction point 23 is connected to the cylinder chamber 5 of the actuator 2rl for the rear left vehicle wheel via a conduit 31 at intermediate points along which there are provided, in order, a one way check valve 25, an electrically conrolled ON/OFF switching valve 27, and an electrically controlled flow rate control valve 29. Thus, the cylinder chambers 5 for the actuators 2fr, 2fl, 2rr, and 2rl are selectively supplied with pressurized fluid from the reservoir 1 respectively via the conduits 10 and 20 and 21, and 22 and 30 and 31; with, as will be described in detail hereinbelow, such supply of pressurized fluid and the flow rate thereof being appropriately and properly controlled by the supply of electrical energy to the respective electrically controlled ON/OFF switching valves 16, 17, 26, and 27 and to the respective electrically controlled flow rate control valves 18, 19, 28, and 29.

To a point of the conduit 20 between the electrically controlled flow rate control valve 18 and the cylinder chamber 5 of the actuator 2fr for the front right vehicle wheel there is connected one end of a conduit 36, the other end of which is connected to a drain conduit 38. At intermediate points on said conduit 36 there are provided an electrically controlled flow rate control valve 32 and an electrically controlled ON/OFF switching valve 34. Similarly, to a point of the conduit 21 between the electrically controlled flow rate control valve 19 and the cylinder chamber 5 of the actuator 2fl for the front left vehicle wheel there is connected one end of a conduit 37, the other end of which is connected to said drain conduit 38, and at intermediate points on said conduit 37 there are provided an electrically controlled flow rate control valve 33 and an electrically controlled ON/OFF switching valve 35. And to a point of the conduit 30 between the electrically controlled flow rate control valve 28 and the cylinder chamber 5 of the actuator 2rr for the rear right vehicle wheel there is connected one end of a conduit 43, the other end of which is connected to the drain conduit 38, and at intermediate points on said conduit 43 there are provided an electrically controlled flow rate control valve 39 and an electrically controlled ON/OFF switching valve 41, while also to a point of the conduit 31 between the electrically controlled flow rate control valve 29 and the cylinder chamber 5 of the actuator 2rl for the rear left vehicle wheel there is connected one end of a conduit 44, the other end of which is connected to said drain conduit 38, and at intermediate points on said conduit 44 there are provided an electrically controlled flow rate control valve 40 and an electrically controlled ON/OFF switching valve 42. Thus, the cylinder chambers 5 for the actuators 2fr, 2fl, 2rr, and 2rl are selectively exhausted of pressurized fluid to the reservoir 1 via the respective conduits 36, 37, 43, and 44, and via the drain conduit 38, with, as will be described in detail hereinbelow, such exhausting of pressurized fluid and the flow rate thereof being appropriately and properly controlled by the supply of electrical energy to the electrically controlled ON/OFF switching valves 34, 35, 41, and 42 and to the electrically controlled flow rate control valves 32, 33, 39, and 40.

In this shown construction, although such constructional details should be understood as not limitative of the present invention, the electrically controlled ON/OFF switching valves 16, 17, 26, 27, 34, 35, 41, and 42 are constructed as normally closed switching valves incorporating such devices as solenoids (not particularly shown), and, when no actuating electrical energy is supplied to the coil (not shown either) of one of said solenoids, the respective one of said switching valves 16, 17, 26, 27, 34, 35, 41, and 42 is closed as schematically shown in the figure so as to intercept and to prevent flow of fluid in the conduit to which said switching valve is fitted, while on the other hand, when actuating electrical energy is supplied to said coil of said one of said solenoids, said respective one of said switching valves 16, 17, 26, 27, 34, 35, 41, and 42 is opened as also schematically shown in the figure so as to allow flow of fluid in said conduit to which said switching valve is fitted. Also, the electrically controlled flow rate control valves 18, 19, 28, 29, 32, 33, 39, and 40 are constructed so as to vary the degree of restriction which they apply to their respective conduits according to the duty ratio of the current or the voltage of actuating pulse electrical signals which they receive, so as to thereby control the flow rate of fluid flowing through the conduits 20, 21, 30, 31, 36, 37, 43, and 44 respectively associated with said flow rate control valves.

To a point on the conduit 20 intermediate between the junction point 11 and the one way check valve 14, i.e. upstream of said one way check valve 14, there is connected an accumulator 45 which has a fluid chamber 49 and an air chamber 50 which are separated from one another by a diaphragm. This accumulator 45 serves to absorb fluctuations in pressure set up in the conduit 10 due to pulsations in the fluid supply provided by the pump 6 and due to the action of the load mitigating valve 8, and to accumulate pressure for the fluid in the conduit 20. Similarly, to a point on the conduit 21 intermediate between the junction point 11 and the one way check valve 15, i.e. upstream of said one way check valve 15, there is connected an accumulator 46 which has a fluid chamber 49 and an air chamber 50 which are separated from one another by a diaphragm. This accumulator 46 similarly serves to absorb fluctuations in pressure set up in the conduit 10 due to pulsations in the fluid supply provided by the pump 6 and due to the action of the load mitigating valve 8, and to accumulate pressure for the fluid in the conduit 21. And, likewise, to a point on the conduit 30 intermediate between the junction point 23 and the one way check valve 24, i.e. upstream of said one way check valve 24, there is connected an accumulator 47 which has a fluid chamber 49 and an air chamber 50 which are separated from one another by a diaphragm, and this accumulator 47 serves to absorb fluctuations in pressure set up in the conduit 22 due to pulsations in the fluid supply provided by the pump 6 and due to the action of the load mitigating valve 8, and to accumulate pressure for the fluid in the conduit 30; while, similarly, to a point on the conduit 31 intermediate between the junction point 23 and the one way check valve 25, i.e. upstream of said one way check valve 25, there is connected an accumulator 48 which has a fluid chamber 49 and an air chamber 50 which are separated from one another by a diaphragm; and this accumulator 48 similarly serves to absorb fluctuations in pressure set up in the conduit 22 due to pulsations in the fluid supply provided by the pump 6 and due to the action of the load mitigating valve 8, and to accumulate pressure for the fluid in the conduit 31.

To another point on the conduit 20 intermediate between the electrically controlled flow rate control valve 18 and the actuator 2*fr* for the front right vehicle wheel there is connected one end of a conduit 55, to the other end of which there is connected a main spring 59 which has a fluid chamber 75 and an air chamber 76 which are separated from one another by a diaphragm. At an intermediate point of said conduit 55 there is fitted a flow rate control valve 51 controlled by an electrically operated motor 79. And to a point on said conduit 55 between said flow rate control valve 51 and said main spring 59 there is connected one end of a conduit 67, to the other end of which there is connected a subspring 71 which has a fluid chamber 77 and an air chamber 78 which are separated from one another by a diaphragm. At an intermediate point of said conduit 67 there is fitted a normally open type ON/OFF switching valve 63 which is controlled by an electrically operated motor 83. Thus, as the volume of the cyliner chamber 5 of this actuator 2*fr* for the front right vehicle wheel varies in response to the bound and the rebound of said front right vehicle wheel, the fluid in said cylinder chamber 5 and in the fluid chambers 75 and 77 of this main spring 59 and this subspring 71 flows to and fro therebetween through the flow rate control valve 51, and the flow resistance caused thereby produces a vibratory damping effect. Similarly, to a point on the conduit 21 intermediate between the electrically controlled flow rate control valve 19 and the actuator 2*fl* for the front left vehicle wheel there is connected one end of a conduit 56, to the other end of which there is connected a main spring 60 which has a fluid chamber 75 and an air chamber 76 which are separated from one another by a diaphragm, and at an intermediate point of said conduit 56 there is fitted a flow rate control valve 52 which is controlled by an electrically operated motor 80. And to a point on said conduit 56 between said flow rate control valve 52 and said main spring 60 there is connected one end of a conduit 68, to the other end of which there is connected a subspring 72 which has a fluid chamber 77 and an air chamber 78 which are separated from one another by a diaphragm. At an intermediate point of said conduit 68 there is fitted a normally open type ON/OFF switching valve 64 which is controlled by an electrically operated motor 84. Thus, as the volume of the cylinder chamber 5 of this actuator 2*fl* for the front left vehicle wheel varies in response to the bound and the rebound of said front left vehicle wheel, the fluid in said cylinder chamber 5 and in the fluid chambers 75 and 77 of this main spring 60 and this subspring 72 similarly flows to and fro therebetween through the flow rate control valve 52, and the flow resistance caused thereby similarly produces a vibratory damping effect. And, correspondingly with relation to the rear suspension for the vehicle, to a point on the conduit 30 intermediate between the electrically controlled flow rate control valve 28 and the actuator 2*rr* for the rear right vehicle wheel there is similarly connected one end of a conduit 57, to the other end of which there is connected a main spring 61 which likewise has a fluid chamber 75 and an air chamber 76 which are separated from one another by a diaphragm. At an intermediate point of said conduit 57 there is fitted a flow rate control valve 53 which is controlled by an electrically operated motor 81, and to a point on said conduit 57 between said flow rate control valve 53 and said main spring 61 there is connected one end of a conduit 69, to the other end of which there is connected a subspring 73 which also has a fluid chamber 77 and an air chamber 78 which are separated from one another by a diaphragm. Ana at an intermediate point of said conduit 69 there is likewise fitted a normally open type ON/OFF switching valve 65 which is controlled by an electrically operated motor 85. Thus, as the volume of the cylinder chamber 5 of this actuator 2*rr* for the rear right vehicle wheel varies in response to the bound and the rebound of said rear right vehicle wheel, the fluid in said cylinder chamber 5 and in the fluid chambers 75 and 77 of this main spring 61 and this subspring 73 flows to and fro therebetween through the flow rate control valve 53, and the flow resistance caused thereby likewise produces a vibratory damping effect. Similarly, to a point on the conduit 31 intermediate between the electrically controlled flow rate control valve 29 and the actuator 2*rl* for the rear left vehicle wheel there is connected one end of a conduit 58, to the other end of which there is connected a main spring 62 which likewise has a fluid chamber 75 and an air chamber 76 which are separated from one another by a diaphragm, and at an intermediate point of said conduit 58 there is fitted a flow rate control valve 54 which is controlled by an electrically operated motor 82. And to a point on said conduit 58 between said flow rate control valve 54 and said spring 62 there is connected one end of a conduit 70, to the other end of which there is connected a subspring 74 which has a fluid chamber 77 and an air chamber 78 which are separated from one another by a diaphragm. At an intermediate point of said conduit 70 there is fitted a similar normally open type ON/OFF switching valve 66 which is controlled by an electrically operated motor 86. Thus, as the volume of the cylinder chamber 5 of this actuator 2*rl* for the rear left vehicle wheel varies in response to the bound and the rebound of said rear left vehicle wheel, the fluid in said cylinder chamber 5 and in the fluid chambers 75 and 77 of this main spring 62 and this subspring 74 similarly flows to and fro therebetween through the flow rate control valve 54, and the flow resistance caused thereby similarly produces a vibratory damping effect.

As will be particularly explained hereinafter, in this preferred embodiment of the vehicle roll control system of the present invention, the damping effect C for the four vehicle wheels is arranged to be switched between three levels—high, medium, and low—according to control of the flow resistance of the flow rate control valves 51, 52, 53, and 54 by the associated respective motors 79, 80, 81, and 82. Also, the springing effect K, i.e. the modulus of elasticity of springing, for the four vehicle wheels is arranged to be switched between two levels—high and low—according to control of the opening and closing of the ON/OFF switching valves 63, 64, 65, and 66 by the associated respective electric motors 83, 84, 85, and 86. And, as will be described shortly, the electric motors 79, 80, 81, and 82 and the electric motors 83, 84, 85, and 86 are selectively energized and controlled by an electrical control device 102, according to signals which said electrical control device 102 receives from a vehicle speed sensor 95, a steering angle sensor 96, a throttle position sensor 97, and a braking sensor 98, so as to minimize nose dive, squat, and roll of the vehicle. Furthermore, vehicle height sensors 87, 88, 89, and 90 are provided respectively to the actuator 2*fr* for the front right vehicle wheel, the actuator 2*fl* for the front left vehicle wheel, the actuator 2*rr* for the rear right vehicle wheel, and the actuator 2*rl* for the rear left vehicle wheel, each functioning so as to sense the displacement of the piston 4 of its associated actuator (or of the suspension arm associated therewith, not particularly shown) so as to produce an electrical output signal representative thereof, i.e. representative of the height of the generally corresponding portion of the vehicle body from the road surface; these electrical output signals are fed to the electrical control device 102.

THE CONSTRUCTION OF THE ELECTRICAL CONTROL DEVICE 102

Referring now particularly to FIG. 2, the construction of the electrical control device 102 and of the micro computer designated as 103 incorporated therein will be explained. This micro computer 103 may, as suggested in FIG. 2, be of per se conventional construction, and in such an exemplary case incorporates a CPU (central processing unit) 104, a ROM (read only memory) 105, a RAM (random access memory) 106, an input port device 107, and an output port device 108, all of these elements being linked together by way of a two way common bus 109.

A vehicle height selection switch 110 is provided in the passenger compartment of the vehicle, capable of being accessed and controlled by the vehicle driver. This vehicle height selection switch 110 is thus settable to any one of three positions, said three positions indicating that the driver desires the vehicle height to be either high (H), normal (N), or low (L), and outputs a signal representative of its setting to the input port device 107 and thus to the micro computer 103. The input port device 107 is also supplied, via a multiplexer 111 and an A/D converter 112, with signals representative of the actual current vehicle heights, designated hereinafter as Hfr, Hfl, Hrr, and Hrl, over the four vehicle wheels outputted by the aforementioned four vehicle height sensors 87, 88, 89, and 90 respectively therefor and amplified by respective amplifiers 87*a*, 88*a*, 89*a*, and 90*a*, and with: a signal representative of the vehicle road speed V outputted from the vehicle road speed sensor 95 and amplified by an amplifier 95*a*, with a signal representative of the steering angle $\delta$ (considering turning to the right as positive) outputted from the steering angle sensor 96 and amplified by an amplifier 96*a*, with a signal representative of the throttle opening $\theta$ outputted by the throttle position sensor 97 and amplified by an amplifier 97*a*, and with a signal representative of whether or not the braking system or systems of the vehicle is being operated outputted by the braking sensor 98 and amplified by an amplifier 98*a*.

In the ROM 105 there are stored reference vehicle heights Hhf and Hhr, Hnf and Hnr, and Hlf and Hlr. Hhf and Hhr are respectively the desired vehicle body heights over the front wheels and over the rear wheels when the vehicle height selection switch 110 is set to high (H); Hnf and Hnr are respectively the desired vehicle body heights over the front wheels and over the rear wheels when the vehicle height selection switch 110 is set to normal (N); and Hlf and Hlr are respectively the desired vehicle body heights over the front wheels and over the rear wheels when the vehicle height selection switch 110 is set to low (L). Thus Hhf>Hnf>Hlf and also Hhr>Hnr>Hlr. Also in the ROM 105 there are stored values representing maps corresponding to the graphs shown in FIGS. 5 through 7 which will be described hereinafter, as well as other constant values. The CPU 104 performs various calculations as will be described shortly, and based upon the results thereof selectively outputs control signals, through the output port device 108: for controlling the drive motors 79 through 82 for the respective flow rate control valves 51 through 54 via respective D/A converters 121*a* through 121*d* and via respective amplifiers 122*a* through 122*d*, for controlling the flow rate control valves 18, 32, 19, 33, 28, 39, 29, and 40 via respective D/A converters 117*a* through 117*h* and via respective amplifiers 119*a* through 119*h*, for controlling the ON/OFF switching valves 16, 34, 17, 35, 26, 41, 27, and 42 via respective D/A converters 118*a* through 118*h* and via respective amplifiers 120*a* through 120*h*, and for controlling the drive motors 83 through 86 for the respective ON/OFF switching valves 63 through 66 via respective D/A converters 123*a* through 123*d* and via respective amplifiers 124*a* through 124*d*. Further, to the output port device 108 there is connected a display unit 116 which indicates to the vehicle driver whether the desired vehicle height set by said vehicle driver on the vehicle height selection switch 110 is currently high (H), normal (N), or low (L). This display unit 116 also indicates to the vehicle driver whether the damping effect control mode set by said driver on a damping effect control mode selection switch, not particularly shown but whose output is also fed to the micro computer 103 via the input port device 107 in the same way as is the output of the vehicle height selection switch 110, is currently (a) a manual normal mode (MN) in which the damping effect C for the suspension system is fixedly adjusted to low (normal), (b) a manual sports mode (MS) in which said damping effect C for the suspension system is fixedly adjusted to medium (sports), (c) an auto normal base mode (ANB) in which said damping effect C for the suspension system is automatically adjusted to low (soft) as a base damping force or to high (hard) in accordance with the current values of various operational parameters of the vehicle, or (d) an auto sports base mode (ASB) in which said damping effect C for the suspension system is automatically adjusted to medium as a base damping force or to high (hard) in accordance with the current values of various operational parameters of the vehicle.

THE PREFERRED EMBODIMENT

Figure 3:
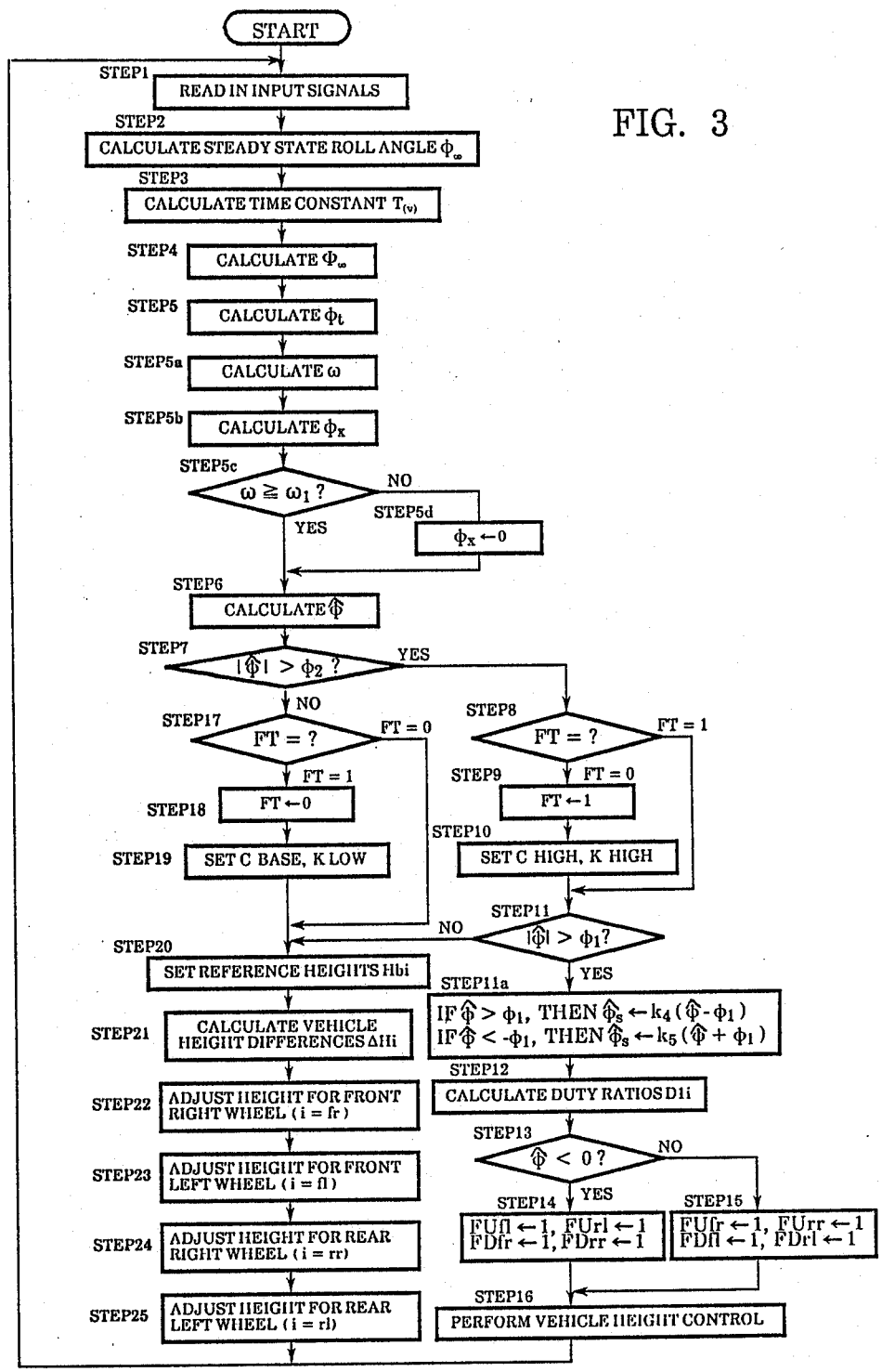
FIG. 3 is a flow chart showing the overall flow of a cyclical program which directs the operation of said micro computer utilized in the preferred embodiment of the vehicle roll control system of the present invention.
Figure 4:
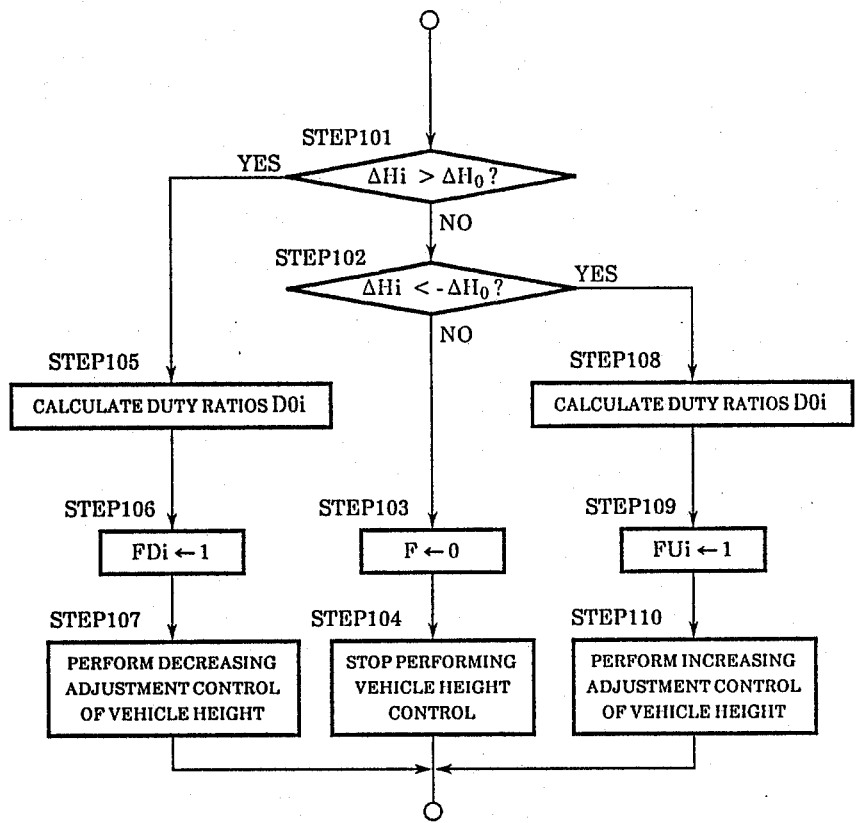
FIG. 4 is a detailed flow chart of a portion of the FIG. 3 program, showing in more detail a routine four invocations of which in FIG. 3 are abbreviated simply as four blocks.

Referring next to the flow charts shown in FIGS. 3 and 4 and the graphs shown in FIGS. 5 through 7, the operation of the micro computer 103 incorporated in the preferred embodiment of the system for vehicle roll control of the present invention as shown in gross detail in FIGS. 1 and 2 will be explained. FIG. 3 is a flow chart showing the overall flow of said operation of said micro computer 103, and it will easily and cursorily be observed that this overall program flow is a repetitive cycle which will typically take place over a certain characteristic approximate cycle time; while FIG. 4 is a flow chart showing in detail a routine which in the flow chart shown in FIG. 3 is abbreviated simply by the steps 22 through 25. In the program of FIGS. 3 and 4, each of the flags FUi (where "i" is "fr", "fl", "rr", and "rl" referring to the front right, the front left, and rear right, and the rear left vehicle wheels respectively) is concerned with whether or not an energizing electrical signal is currently being supplied to the corresponding one of the flow rate control valves 18, 19, 28, and 29, and the corresponding one of the withstanding valves 16, 17, 26, and 27, for supplying the corresponding one of the actuators 2fr, 2fl, 2rr, and 2rl with pressurized working fluid, and in this case a flag value of zero indicates that the energizing electrical signal is not currently being supplied while a flag value of unity indicates that an energizing electrical signal is currently being supplied. Similarly, each of the flags FDi (where "i" is again "fr", "fl", "rr", and "rl" referring to the front right, the front left, the rear right, and the rear left vehicle wheels respectively) is concerned with whether or not an energizing electrical signal is currently being supplied to the corresponding one of the flow rate control valves 32, 33, 39, and 40 and the corresponding one of the switching valves 34, 35, 41, and 42 for venting working fluid from the corresponding one of the actuators 2fr, 2fl, 2rr, and 2rl, and in this case a flag value of zero indicates that an energizing electrical signal is not currently being supplied while a flag value of unity indicates that an energizing electrical signal is currently being supplied. Further, the flags FTi (where "i" is again "fr", "fl", "rr", and "rl" referring to the front right, the front left, the rear right, and the rear left vehicle wheels respectively) are concerned with the setting of the damping effect C and of the spring rate K, and in this case a flag value of zero indicated that the damping effect C is adjusted to a base mode (low in the case of the auto normal base mode (ANB), and medium in the case of the auto sports base mode (ASB), and the spring rate K is adjusted to low, while a flag value of unity indicates that the damping effect C and the spring rate K are both adjusted to high. Further, the expression "flags Fi" will be used as a general term for referring to these flags FUi, FDi, and FTi.

In the first step 1, first, the vehicle heights Hi (where "i" is again "fr", "fl", "rr", and "rl" referring to the front right, the front left, the rear right, and the rear left vehicle wheels) detected by the respective vehicle height sensors 87 through 90, the vehicle speed V detected by the vehicle speed sensor 95, the steering angle $\delta$ detected by the steering angle sensor 96, the throttle opening $\theta$ detected by the throttle position sensor 97, the vehicle braking state detected by the braking sensor 98, the switch function S input from the vehicle height selection switch 110, and the damping effect selecting switch function input from the damping effect selecting switch not shown in the figure, are in turn read in, and then the flow of control passes to the next step 2.

Figure 5:
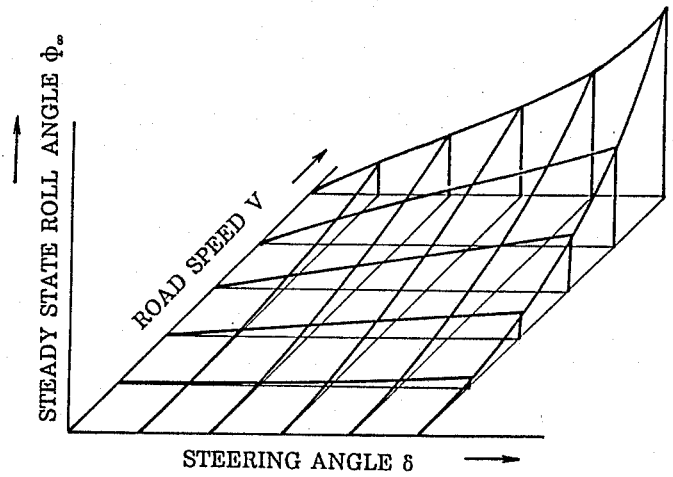
FIG. 5 is a graph relating to said preferred embodiment, exemplarily showing the positive quadrant portion of a map stored in said micro computer and corresponding to a steady state roll angle $\phi_\infty$ for the vehicle body.

In the next step 2, based upon the vehicle speed V and the steering angle $\delta$ read in in the step 1, a steady state roll angle $\phi_\infty$ is calculated from the map corresponding to the graph whose positive quadrant is shown in FIG. 5, values representative of which are stored in the ROM 105; in this case, the anticlockwise direction relative to the forward direction of the vehicle is considered positive as far as the sign of the steady state angle $\phi_\infty$ is considered. (Other quadrants of this map are not shown in FIG. 5 in the interests of convenience of drafting and explanation). Subsequently the flow of control passes to the next step 3.

In this next step 3, based upon the vehicle speed V read in in the step 1, a time constant T(V) is calculated which has vehicle speed V as a parameter and is utilized in the equation used in the step 4 to be described shortly. Subsequently the flow of control passes next to this step 4.

In this next step 4, based upon the value $\phi_\infty$ calculated in the previous step 2 and upon the value of T(V) calculated in the previous step 3, compensating value $\Phi_\infty$ of roll angle is calculated following the equation described below, and then the flow of control passes next to the step 5. In this equation, s is the Laplace operator.

$$\phi_\infty = \frac{T(V)s}{1 + T(V)s} \phi_\infty \qquad (10)$$

In the next step 5, an actual roll angle $\phi_f$ of the vehicle body as far as the front wheels are concerned, an actual roll angle $\phi_r$ of the vehicle body as far as the rear wheels are concerned, and the instantaneous value $\phi_t$ of the roll angle of the vehicle body which is the average value of these actual roll angles are calculated, following the equations described below, the next the flow of control passes to the step 5a.

$$\phi_f = \tan^{-1} \frac{Hfr - Hfl}{Tf} \qquad (11)$$

$$\phi_r = \tan^{-1} \frac{Hrr - Hrl}{Tr} \qquad (12)$$

$$\phi_t = (\phi_f + \phi_r)/2 \qquad (13)$$

In the step 5a, by making a time differential calculation based upon the steering angle read in in the step 1, a steering velocity $\omega$ is calculated, following the equation described below; and then the flow of control passes next to the step 5d.

$$\omega = \delta_n - \delta_{n-1}$$

wherein $\delta_{n-1}$ is the steering angle sensed at a time point that was a determinate short time period before the time point when $\delta_n$ was sensed.

In the step 5b, an amendment value $\phi_x$ of roll angle is calculated from a relationship between steering viscosity $\omega$ and said amendment value $\phi_x$ stored in the ROM 105; and then the flow of control passes next to the step 5c. In this connection, it should be understood that this amendment value $\phi_x$ may be in a direct proportion to the steering velocity $\omega$ or may be a high degree polynomial function of said steering velocity $\omega$, in which case the steering velocity $\omega$ increases the amendment value $\phi_x$ will increase at a higher rate than in the previously mentioned case of a directly proportional relationship.

In the decision step 5c, a decision is made as to whether or not the value of the steering velocity $\omega$ is greater than or equal to a controlling threshold value $\omega_1$. If the result of this decision is YES, so that in fact said value of said steering velocity ω is greater than or equal to said controlling threshold value $\omega_1$, then the flow of control skips to pass next to the next step 6; but, if the result of this decision is NO, so that in fact said value of said steering velocity ω is less than said controlling threshold value $\omega_1$, then the flow of control passes next to the step 5d. And, in the step 5d, the amendment value $\phi_x$ of roll angle is forcibly set to zero, and then the flow or control passes next to the step 6.

Although such a concept is not shown in any particular flow chart or the like laid out herein, it should be understood that the flow chart may alternatively go, in outline, as follows: a decision as to whether or not the value of ω is greater than or equal to $\omega_1$ may be made in a step 5b' which is carried out subsequent to the step 5a' in which ω is calculated; if a decision is made in said step 5b' that the value of ω is greater than or equal to $\omega_1$, then the differential $\hat{\phi}$ may be calculated in the next step 6a following the equation described hereinbelow; if a decision is on the other hand made in said step 5b' that the value of ω is not greater than or equal to $\omega_1$, then the differential $\hat{\phi}$ may be calculated in the next step 6b following an equation which is the same as the equation no. 14 except that the term "$k_3\phi_x$" is omitted; and, after the step 6a or 6b has been performed, the flow of control may then pass next to the step 7 of the FIG. 3 flow chart. Such a variation is within the concept of the present invention.

Reverting now to the actual example shown, in the step 6, the difference $\hat{\phi}$ between a desired roll angle $\phi_a$ stored in the ROM 105 and the compensating value $\Phi_\infty$ plus the instantaneous value $\phi_t$ of the roll angle plus the amendment value $\phi_x$ of the roll angle is calculated, following the equation described below. Although the desired roll angle $\phi_a$ is taken as being zero in the embodiment shown, it may in fact have a constant value near zero, the absolute value of which is less than $\phi_o$ described below, and the sign of which is positive and negative when $\phi_\infty$ is positive and negative, respectively. Subsequently, the flow of control passes next to the decision step 7.

$$\hat{\phi} = \phi_a - (k_1\Phi_{28} + k_2\phi_t + k_3\phi_x) \quad (14)$$

where k1, k2, and k3 are positive constants.

In this next decision step 7, a decision is made as to whether or not the absolute value of the roll angle difference $\hat{\phi}$, calculated in the previous step 6, is greater than a controlling threshold value $\phi_2$ which is a positive constant near zero. If a decision is made that the absolute value of the difference $\hat{\phi}$ is greater than the predetermined value $\phi_2$, then the flow of control passes next to the decision step 8; while, if a decision is made that the absolute value of the difference $\hat{\phi}$ is not greater than the predetermined value $\phi_2$, then the flow of control passes next to the decision step 17.

In the step 8, a decision is made as to whether or not the value of the flag FT is zero or unity. If the result of this decision is that the value of the flag FT is zero, then the flow of control passes next to the step 9; while, on the other hand, if the result of this decision is that the value of the flag FT is unity, then the flow of control skips to pass next to the decision step 11.

In the step 9, the value of the flag FT is set to unity, and then the flow of control passes next to the step 10.

In the step 10, the energizing electrical signals supplied to the motors 79 to 82 and 83 to 86 and controlled to set the suspension damping effect C to high and also to set the spring rate K to high; and then the flow of control passes next to the decision step 11.

In this decision step 11, a decision is made as to whether or not the absolute value of the roll angle difference $\hat{\phi}$, calculated in the previous step 6, is greater than another controlling threshold value $\phi_1$ which is a positive constant greater than the previously mentioned threshold value $\phi_2$. If a decision is made that the absolute value of the difference $\hat{\phi}$ is greater than this threshold value $\phi_1$, then the flow of control passes next to the step 11a; while, if a decision is made that the absolute value of the difference $\hat{\phi}$ is not greater than this threshold value $\phi_1$, then the flow of control passes next to the step 20.

Figure 10:
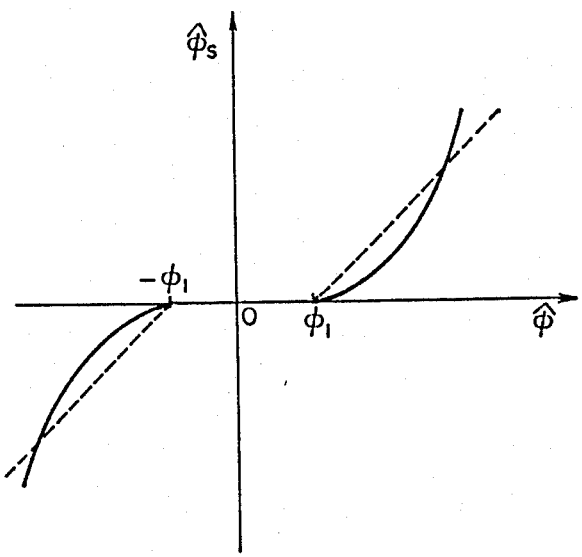
FIG. 10 is a graph for showing how a so called threshold filter calculation is carried out upon a value $\phi$ representing roll angle difference.

In the step 11a, as shown schematically in FIG. 10, by carrying out a so called threshold filter calculation upon the roll angle difference $\hat{\phi}$, following the equations:

$$\hat{\phi}_s = k_4(\hat{\phi} - \phi_1)(\hat{\phi} > \phi_1)$$

$$\hat{\phi}_s = k_5(\hat{\phi} + \phi_1)(\hat{\phi} < -\phi_1)$$

where k4 and k5 are positive coefficients, a modified value $\hat{\phi}_s$ of the roll angle difference is calculated; and then the flow of control passes next to the step 12.

Figure 6:
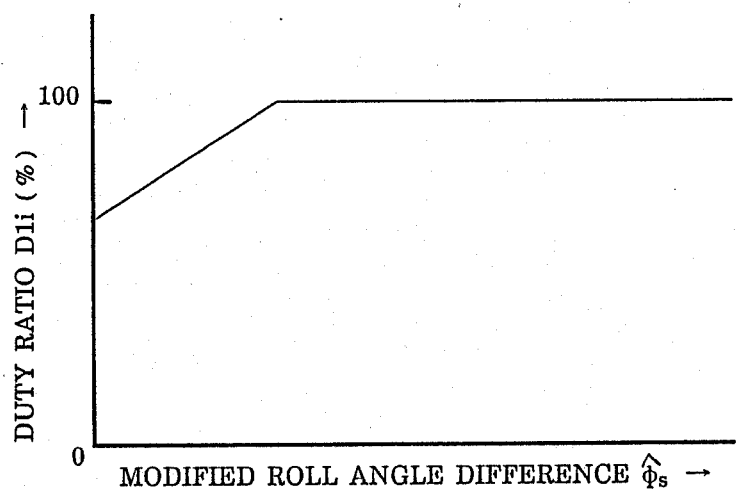
FIG. 6 is a graph relating to said preferred embodiment, exemplarily showing a map stored in said micro computer and corresponding to the duty ratio for an energizing electrical signal Dli to be supplied to a flow rate control valve for performing roll control by vehicle height adjustment.

In this step 12, based upon this modified value $\hat{\phi}_s$ of the roll angle difference calculated in the step 11, duty ratios Dli are calculated for the energizing electrical signals supplied to the flow rate control valves from maps like the map which corresponds to the graph exemplarily shown in FIG. 6 stored in the ROM 105, and then the flow of control passes to the next step 13.

In this connection, it should be noted that the step 11a may be omitted, in an alternative embodiment of the present invention, and then in that case in the step 12 the duty ratios Dli are calculated based upon the differential value $\hat{\phi}$ of roll angle, rather than upon the modified value $\hat{\phi}_s$ thereof.

In this next step 13, a decision is made as to whether or not the steering angle difference $\hat{\phi}$ is positive. If a decision is made that $\hat{\phi}$ is less than zero, the flow of control passes next to the step 14, while, on the other hand, if a decision is made that $\hat{\phi}$ is not less than zero, then the flow of control passes next to the step 15.

In the step 14, the flags FUfl, FUrl, FDfr, FDrr, and FTi are set to unity. Then the flow of control passes next to the step 16.

On the other hand, in the step 15, the flags FUfr, FUrr, FDfl, FDrl, and FTi are set to unity. Then the flow of control passes next to the step 16.

In the step 16, the vehicle height control is performed. In other words, if the flow of control has arrived at this step 16 via the step 14, energizing electrical signal with duty ratios Dfl and Drl are supplied to the flow rate control valves 19 and 29 for supplying fluid to the actuator 2fl for the front left wheel and to the actuator 2rl for the rear left wheel, respectively. And, similarly, energizing electrical signals with duty ratios Dfr and Drr are supplied to the flow rate control valves 32 and 39 for discharging fluid from the actuator 2fr for the front right wheel and from the actuator 2rr for the rear right wheel, respectively. Simultaneously, energizing electrical signals are supplied to the associated ON/OFF switching valves 17, 27, 34, and 41 for opening them, while no energizing electrical signals are supplied to the other ON/OFF switching valves 16, 26, 35, and 42, thus leaving them closed. Thus, the vehicle height is thereby increasingly adjusted on the left side of the vehicle and is simultaneously decreasingly adjusted on the right side of the vehicle. On the other hand, if the flow of control has arrived at this step 16 via the step 15, energizing electrical signals with duty ratios Dfr and Drr are supplied to the flow rate control valves 18 and 28 for supplying fluid to the actuator 2fr for the front right wheel and to the actuator 2rr for the rear right wheel, respectively. And, similarly, energizing electrical signal with duty ratios Dfl and Drl are supplied to the flow rate control valves 33 and 40 for discharging fluid from the actuator 2fl for the front left wheel and from the actuator 2rl for the rear left wheel, respectively. Simultaneously, energizing electrical signals are supplied to the associated ON/OFF switching valves 16, 26, 35, and 42 for opening them, while no energizing electrical signals are supplied to the other ON/OFF switching valves 17, 27, 34, and 41, thus leaving them closed. Thus, the vehicle height is thereby increasingly adjusted on the right side of the vehicle and is simultaneously decreasingly adjusted on the left side of the vehicle. After the flow of control has thus finished this step 16, the program flow returns back to the step 1, to loop around again and again.

On the other hand, in the other program branch, in the step 17, a decision is made as to whether or not the value of the flag FT is zero or unity. If the result of this decision is that the value of the flag FT is unity, then the flow of control passes next to the step 18; while, on the other hand, if the result of this decision is that the value of the flag FT is zero, then the flow of control skips to pass next to the step 20.

In the step 18, the value of the flag FT is set to zero, and then the flow of control passes next to the step 19.

In the step 19, the energizing electrical signals supplied to the motors 79 to 82 and 83 to 86 are controlled to set the suspension damping effect C to base mode and to set the spring rate K to low; and then the flow of control passes next to the step 20.

In the step 20, if as detected from the signal representative thereof sent via the input port device 107 to the micro computer 103, the setting of the vehicle height selection switch 110 is high (H), then the reference vehicle heights Hbfr and Hbfl for the front wheels are set at Hhf and the reference vehicle heights Hbrr and Hbrl for the rear wheels are set at Hhr; if said setting of said vehicle height selection switch 110 is normal (N), then the reference vehicle heights Hbfr and Hbfl for the front wheels are set at Hnf and the reference vehicle heights Hbrr and Hbrl for the rear wheels are set at Hnr; and, if said setting of said vehicle height selection switch 110 is low (L), then the reference vehicle heights Hbfr and Hbfl for the front wheels are set at Hlf and the reference vehicle heights Hbrr and Hbrl for the rear wheels are set at Hlr. In any of these three cases, next the flow of control passes to the step 21.

In the step 21, with regard to the four wheels, the differences $\Delta Hi$ between the actual vehicle heights Hi and the reference vehicle heights Hbi are calculated following the formula expounded below, and then the flow of control passes next to the step 22.

$$\Delta Hi = Hi - Hbi$$

In the step 22, the subroutine whose flow chart is shown in FIG. 4 is carried out with "i" being "fr", to thereby adjust the vehicle riding height for the front right wheel, and then the flow of control passes next to the step 23.

Next, in the step 23, the subroutine whose flow chart is shown in FIG. 4 is carried out with "i" being "fl", to thereby adjust the vehicle riding height for the front left wheel, and then the flow of control passes next to the step 24.

Next, in the step 24, the subroutine whose flow chart is shown in FIG. 4 is carried out with "i" being "rr", to thereby adjust the vehicle riding height for the rear right wheel, and then the flow of control passes next to the step 25.

Finally, in the next step 25, the subroutine whose flow chart is shown in FIG. 4 is carried out with "i" being "rl", to thereby adjust the vehicle riding height for the rear left wheel, and then as before the program flow returns back to the step 1, to loop around again and again.

Although no particular details thereof are given herein in the interests of economy of description, if the conditions which cause nose dive and squat of the vehicle body are detected, a control routine is carried out by an interrupt in order to suppress such undesired phenomena, and in this control routine the degree of flow restriction provided by the flow rate control valves 51 through 54 is increased in order to change the suspension damping effect C to high, and the ON/OFF switching valves 63 through 66 are also opened in order to change the spring rate K to high.

Next, referring to the flow chart shown in FIG. 4, the subroutine which is performed as described above in the steps 22, 23, 24, and 25 for each of the four vehicle wheels, in order to adjust the vehicle riding height at said wheels, will be explained.

In the first step 101, a decision is made as to whether or not the vehicle height difference $\Delta Hi$ is more than a controlling threshold value $\Delta H_o$. If a decision is made that $\Delta Hi$ is not more than $\Delta H_o$, the flow of control passes next to the step 102; while, on the other hand, if a decision is made that $\Delta Hi$ is more than $\Delta H_o$, the flow of control passes next to the step 105.

In the step 102, a decision is made as to whether or not the vehicle height difference $\Delta Hi$ is less than $-\Delta H_o$. If a decision is made that $\Delta Hi$ is not less than $-\Delta H_o$, the flow of control passes next to the step 103; while, on the other hand, if a decision is made that $\Delta Hi$ is less than $-\Delta H_o$, the flow of control passes next to the step 108.

In the step 103, all the flags Fi are reset to zero, and then the flow of control passes next to the step 104.

In the step 104, supplying of actuating electrical signals is stopped to the flow control valves 18, 19, 28, 29, 32, 33, 39, and 40, and to the switching valves 16, 17, 26, 27, 34, 35, 41, and 42, to thereby cease the adjustment of the vehicle height at all of the four wheels thereof. Then the flow of program control passes next to exit from this FIG. 4 subroutine, without doing anything further.

Figure 7:
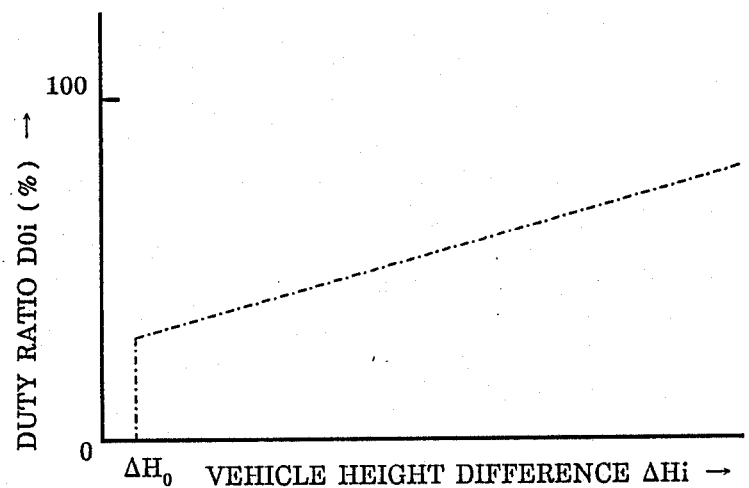
FIG. 7 is a similar graph to FIG. 6, exemplarily showing a map stored in said micro computer and corresponding to the duty ratio for another energizing electrical signal DOi to be supplied to a flow rate control valve for performing normal vehicle height adjustment.

On the other hand, in the step 105, based upon the vehicle height difference $\Delta Hi$, a duty ratio DOi for the energizing electrical signal to be supplied to the particular flow rate control valve 32, 33, 39, or 40 for discharging fluid from the actuator 2fr, 2fl, 2rr, or 2rl for this particular vehicle wheel "i" is calculated from the map corresponding to the graph shown in FIG. 7 stored in the ROM 105, and then the flow of control passes next to the step 106.

In the step 106 the flag FDi is set to unity, and then the flow of control passes next to the step 107.

In the step 107, an energizing electrical signal is supplied with the duty ratio DOi to said particular associated flow rate control valve 32, 33, 39, or 40 for discharging fluid from the actuator 2fr, 2fl, 2rr, or 2rl for this particular vehicle wheel "i", and simultaneously therewith an energizing electrical signal is supplied to the associated switching valve 34, 35, 41, or 42, thus to perform the decreasing adjustment of the vehicle riding height at this particular wheel. Then the flow of program control passes next to exit from this FIG. 4 subroutine, without doing anything further.

In the third program branch, in the step 108, based upon the vehicle height difference $\Delta Hi$, a duty ratio DOi for the energizing electrical signal to be supplied to the particular flow rate control valve 18, 19, 28, or 29 for supplying pressurized fluid into the actuator 2fr, 2fl, 2rr, or 2rl for this particular vehicle wheel "i" is calculated from the map corresponding to the graph shown in FIG. 7 stored in the ROM 105, and then the flow of control passes next to the step 109.

In the step 109 the flag FUi is set to unity, and then the flow of control passes next to the step 110.

In the step 110, an energizing electrical signal is supplied with the duty ratio DOi to said particular associated flow rate control valve 18, 19, 28, or 29 for supplying pressurized fluid into the actuator 2fr, 2fl, 2rr, or 2rl for this particular vehicle wheel "i", and simultaneously therewith an energizing electrical signal is supplied to the associated switching valve 16, 17, 26, or 27, thus to perform the increasing adjustment of the vehicle riding height at this particular wheel. Then, again, the flow of program control passes next to exit from this FIG. 4 subroutine, without doing anything further.

Thus, in the steps 101 to 110, the heights from the road surface of the portions of the vehicle body at locations corresponding to the vehicle wheels are adjusted within the desired vehicle height range $Hbi \pm \Delta H_o$, while the vehicle is not experiencing conditions which cause the vehicle body to roll to an extent more than a predetermined amount. Preferably, the controlling threshold $\Delta H_o$ for the vehicle height is set to be substantially equal to or less than the absolute value of the difference $\Delta Hi$ of the vehicle heights for the vehicle wheels in the case where the absolute value of the roll angle difference $\hat{\phi}$ is $\phi_1$. And, therefore, $\Delta H_o$ may be set individually for each wheel, or may be set individually for the front wheels and for the rear wheels.

Figure 8:
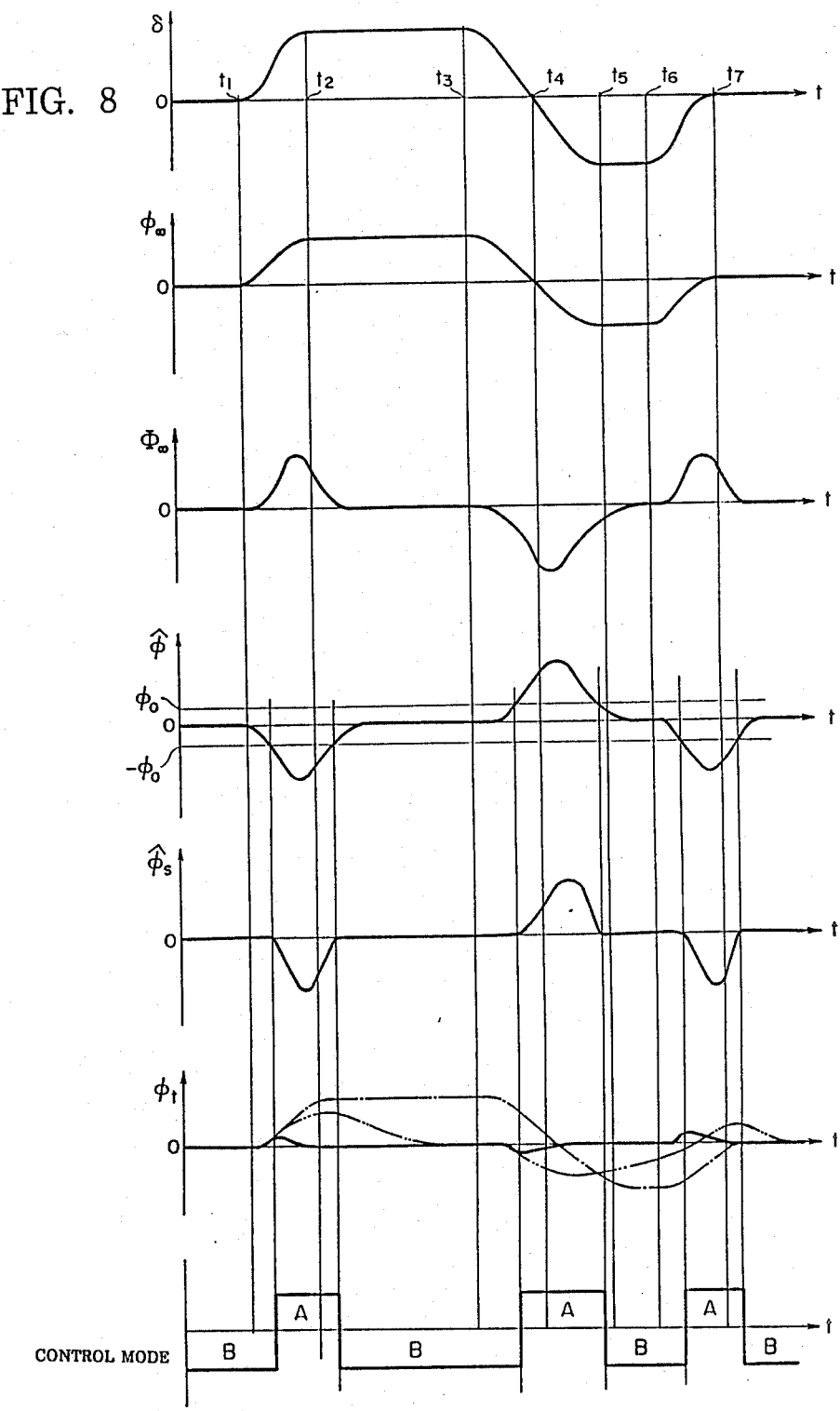
FIG. 8 is a time chart for illustrating the operation of this preferred embodiment.
Figure 9:
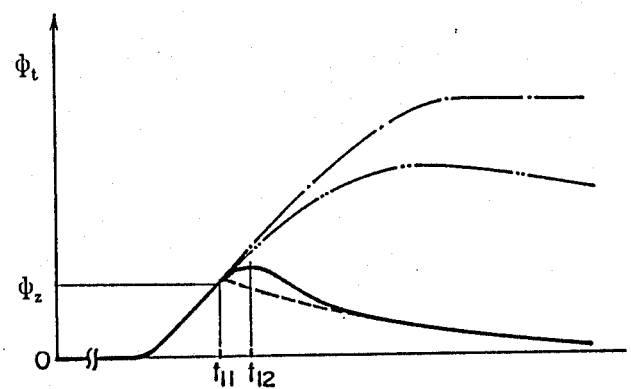
FIG. 9 is an enlarged view of a portion of said FIG. 8 time chart which particularly relates to the actual roll angle $\phi_t$ of the vehicle body.

Next, referring to the program flow charts shown in FIGS. 3 and 4 and to the time charts shown in FIGS. 8 and 9, the operation of this preferred embodiment as disclosed above with regard to the suspension system shown in FIGS. 1 and 2 will be further explained with regard to the case, again utilized as an example, in which the vehicle runs along a road which is curved like a letter "S".

In the time chart of FIG. 8, the notation of "A" for the control mode indicates the periods wherein the roll control is performed via vehicle height adjustment based upon the roll prediction which is carried out in the steps 11a to 16 shown in the flow chart of FIG. 3, and the notation of "B" for the control mode indicates the periods wherein per se conventional vehicle height adjustment based upon the actual detected vehicle height differences $\Delta Hi$ is performed which is carried out in the steps 20 to 25 shown in the flow chart of FIG. 3.

Referring to FIG. 8, in the period up to the time point t1, since the steering angle $\delta$ is zero, and accordingly $\phi_\infty$ and $\phi_t$ are zero, in each iteration of the FIG. 3 program a decision of NO is made in the step 7. In the event where the vehicle height differences $\Delta Hi$ are within the desired vehicle height ranges $Hbi \pm \Delta H_o$, decisions of NO are made in the steps 101 and 102 shown in FIG. 4, and accordingly no increasing or decreasing adjustment of the vehicle height is performed. In the event where the vehicle height differences $\Delta Hi$ are more than $\Delta H_o$, a decision of YES is made in the step 101; the duty ratio DOi is calculated in the step 105; an energizing electrical signal is supplied with that duty ratio DOi to the appropriate flow control valves for discharging fluid from the appropriate ones of the actuators, and simultaneously therewith an energizing electrical signal is supplied to the associated switching valves, to thereby decreasingly adjust the vehicle height within the desired vehicle height range $Hbi \pm \Delta H_o$. In the event where the vehicle height difference $\Delta Hi$ is less than $-\Delta H_o$, a decision of YES is made in the step 102; the duty ratio DOi is calculated in the step 108; an energizing electrical signal is supplied with that duty ratio DOi to the appropriate flow control valves for supplying pressurized working fluid to the appropriate ones of the actuators, and simultaneously therewith an energizing electrical signal is supplied to the associated switching valves, to thereby increasingly adjust the vehicle height within the desired vehicle height range $Hbi \pm \Delta H_o$. In this case, the damping effect is controlled to be in the base mode and the spring rate is controlled to be set at low, thereby to enhance the comfortability of the vehicle.

In the exemplary operational episode of FIG. 8, it is assumed that at the time point t1 turning right is initiated with clockwise turning of the steering wheel being initiated; at the time point t2 the vehicle starts to undergo steady state turning with the steering angle $\delta$ being constant, i.e. the steering wheel is stopped from being turned clockwise; at the time point t3 turning of the steering wheel in the opposite anticlockwise direction (to unwind the turn) is initiated; at the time point t4 the steering angle becomes zero (and the steering wheel anticlockwise turning is continued from this time point since the vehicle is being driven around a series of S-bends); at the time point t5 the vehicle is brought to the steady state left turning condition with a constant steering angle, i.e. the steering wheel is stopped from being turned anticlockwise; at the time point t6 turning back of the steering wheel in the clockwise direction is initiated; and at the time point t7 the vehicle is brought from the turning right state to the straight forward running state; and the steering velocity $\omega$ is smaller than $\omega_1$. Under these circumstances, a decision of NO is made in the step 5c of the flow chart shown in FIG. 3, and the steady state roll angle $\phi_\infty$ and the other variables illustrated vary with time in such a manner as shown in FIG. 8.

When the absolute value of $\hat{\phi}$ is equal to or less than $\phi_1$, a decision of NO is made in the steps 7 and 11, and thereby the steps 20 through 25 are carried out as in the case of the above described forward running state in order to adjust the vehicle height Hi within the desired vehicle height range $Hbi \pm \Delta H_o$. In this case, in the periods where the absolute value of the difference $\hat{\phi}$ is equal to or less than $\phi_2$, the damping effect is controlled to be in the base mode and the spring rate is controlled to be set at low, while in the periods where the absolute value of the difference $\hat{\phi}$ is greater than $\phi_2$ but is less than $\phi_1$, the damping effect and the spring effect are adjusted to high.

In the event where the absolute value of $\hat{\phi}$ is greater than $\phi_1$, then decisions of YES are made in the steps 7 and 11; a modified value $\hat{\phi}_s$ of $\hat{\phi}$ is calculated in the step 11a; the duty ratio Dli is calculated based upon this modified value $\hat{\phi}_s$ in the step 12; the sign of $\hat{\phi}$ is determined in the step 13; and then the flow of control proceeds to the step 16 by way of the step 14 in the event where $\hat{\phi}$ is less than zero, and by way of the step 15 in the event where $\hat{\phi}$ is greater than zero, and the vehicle height adjustment is performed to prevent the vehicle body from rolling, and the suspension damping effect and the spring rate are both maintained at high. In this case, the actual roll angle $\phi_t$ of the vehicle body gradually increases from zero due to the centrifugal force acting upon the vehicle body. Since the absolute value of the modified value $\hat{\phi}_s$ of the roll angle difference is smaller than the absolute value of the difference $\hat{\phi}$ at a time point t11 when the actual roll angle $\phi_t$ becomes a determinate value $\phi_g$, and the absolute value of $\phi_t$ reaches a maximum value at a time point t12 that is behind the time point t11, during the period between these time points the duty ratio of the electrical signal supplied to the flow control valves is smaller than that at the time point t12, and the absolute value of the actual roll angle $\phi_t$ is larger than the determinate value, and the actual roll angle produces a smooth curve around the time point t11.

In this connection it will be seen that, if the steering wheel is returned back toward the neutral position and the absolute value of $\hat{\phi}$ becomes equal to or less than $\phi_1$, a decision of NO is made in the step 11 and the flow of program control returns to the normal vehicle height adjusting mode by the steps 20 to 25.

Further, although such an occurrence is not shown in the time charts of FIGS. 8 and 9, in the event where the steering velocity $\omega$ is equal to or is greater than $\omega_1$ as is the case when emergency steering is effected, since $\hat{\phi}$ is rapidly increased by the term $k3\phi_x$ in the above described equation 14, rolling of the vehicle body can be prevented previously, positively, and precisely.

Thus, while the actual roll angle $\phi_t$ varies as shown by the one point chain line and by the two points chain line in FIG. 8 in the event where roll control by the vehicle height adjustment is not performed and in the event where only normal per se known vehicle height adjustment based upon the vehicle height difference is effected, respectively, on the other hand, with the preferred embodiment of the vehicle roll control system of the present invention as described above and as shown in the drawings, the actual roll angle varies as shown by the solid line, and accordingly the vehicle body is very effectively prevented from rolling without any substantial time lag in response, as compared with the prior art. Although in the case where the modified value $\hat{\phi}_s$ is not calculated the actual roll angle $\phi_t$ of the vehicle body varies as shown by the broken lines in FIGS. 8 and 9, and the rate of change thereof changes rapidly around the time point t11, in the preferred embodiment shown the actual roll angle $\phi_t$ varies smoothly, to thereby eliminate the possibility that the driver and/or the passengers in the vehicle will feel uneasiness or discomfort.

From the above description, it will be seen that according to the present invention a steady state roll angle $\phi_\infty$ of the vehicle body and a compensating value $\Phi_\infty$ of roll angle are calculated from the vehicle speed V and the steering angle $\delta$; a steering velocity $\omega$ is calculated from the steering angle $\delta$; am amendment value $\phi_x$ of roll angle is calculated in accordance with the steering velocity $\omega$; the instantaneous value $\phi_t$ of roll angle of the vehicle body is calculated from the vehicle heights Hi; a roll angle difference $\hat{\phi}$ is calculated from the desired roll angle $\phi_a$, the compensating value $\Phi_\infty$, the amendment value $\phi_x$, and the instantaneous value $\phi_t$; in the event when the absolute value of the roll angle difference $\hat{\phi}$ is equal to or less than a first determinate value, the normal vehicle height adjustment is performed so that the vehicle height can be adjusted within the desired vehicle height range, and the hardness and softness characteristics of the suspension means are controlled in accordance with the roll angle difference so that the roll amount of the vehicle body is reduced in the periods when the roll amount is relatively small and yet the confortability of the vehicle is enhanced; while, in the event when the absolute value of the roll angle difference exceeds the first determinate value, the modified value $\hat{\phi}_s$ of the roll angle difference is calculated and the flow rate control valves are operated by electrical signals having duty ratios corresponding to this modified value, so that even in the event of rapid steering the roll control is accurately effected without any substantial time lag in response, whereby the possibility is eliminated that the vehicle driver and/or the passengers might feel uneasiness or discomfort due to any rapid change in the rate of change of the actual roll angle of the vehicle body; and, even in the event of emergency steering, the vehicle body can be previously, positively, and precisely prevented from rolling.

Although, in the preferred embodiment described above, the determination of the rolling direction in the step 13 was performed by determining the sign of the roll angle difference $\hat{\phi}$, this determination might alternatively be effected by determining the sign of the compensating value $\Phi_\infty$ of roll angle or of the modified value $\hat{\phi}_s$. While, in this preferred embodiment described above, an instantaneous value $\phi_t$ of roll angle of the vehicle body was determined by calculation from the vehicle heights Hi at locations corresponding to the respective vehicle wheels, in an alternative embodiment such an instantaneous value $\phi_t$ of vehicle body roll angle might alternatively be determined by a direct detection process with angular detecting devices such as gyroscopes or the like, or by calculation based upon the output of a lateral acceleration sensor or the like. It should yet further be noted that, although the damping effect and the spring rate were set to be at high for each wheel during turning, in the step 16, together with the adjustment of the vehicle height, the damping effect and the spring rate may be set at high only for the wheels on the radially outward side, and the damping effect may be controlled in the base mode and the spring rate may be set at low for the wheels on the radially inward side. Furthermore, by replacing the actual roll angle $\phi_t$ with $\phi_{tf}$ and $\phi_{tr}$ in the equation (14), to calculate roll angle differences $\hat{\phi}_f$ and $\hat{\phi}_r$ on both the front vehicle wheel side and the rear vehicle wheel side, and performing the step 7 and the following steps on both the vehicle wheel sides, the system can be made workable even in the event where the roll rigidity of the vehicle body is relatively considerably different between the front vehicle wheels side and the rear vehicle wheels side, and the hardness and the softness characteristics of the suspension means may be individually controlled in a proper manner on both the front vehicle wheels side and the rear vehicle wheels side.

Further, although in the embodiment shown the values k3 and k4 are zero in the region where the absolute value of $\hat{\phi}$ is less than $\phi_1$, and are non zero functions of $\hat{\phi}$ in other regions, it would alternatively be possible for them to be positive constants in said other regions. In the latter case, the modified value $\phi_s$ would vary as shown by a broken line in FIG. 10.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example the actuators $2fr$, $2fl$, $2rr$, and $2rl$ for controlling the suspension distances of the four vehicle wheels from the vehicle body, rather than being hydraulic actuators as was the case in the shown preferred embodiment, could in an alternative application be electric or pneumatic actuators. Further, the function of such actuators could be provided by a differential twist device provided in the central portion of a stabilizer bar provided between left and right side wheels of the vehicle, as is for example suggested in Japanese Patent Publication Ser. No. 61-24609, which however it is not intended hereby to admit as prior art to the present patent application except to the extent in any case otherwise mandated by applicable law. Other modifications of any particular embodiment of the present invention could be conceived of. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. For a vehicle comprising a body and a plurality of wheels upon which said vehicle runs, a vehicle roll control system of vehicle height adjustment type, comprising:
    a plurality of actuator assemblies each corresponding to one of said vehicle wheels and resiliently suspending said corresponding vehicle wheel from the vehicle body, each one of said actuator assemblies being adapted to increase or decrease vehicle height at a location corresponding to said corresponding vehicle wheel in accordance with signals supplied thereto;
    a plurality of control means, each corresponding to one of said actuator assemblies and serving to supply said control signals to said corresponding actuator assembly;
    a vehicle speed detecting means for sensing a road speed of the vehicle;
    a steering angle detecting means for sensing a steering angle of the vehicle;
    a steering angle change rate detecting means for detecting the rate of change of said steering angle of the vehicle;
    a means for detecting an actual roll angle $\phi_t$ of the body of the vehicle; and
    a means for computing and control adapted to compute a steady state roll angle $\phi_\infty$ of the vehicle body based upon the vehicle speed sensed by said vehicle speed detecting means and the steering angle sensed by said steering angle detecting means; to advance a phase of a signal representative of said steady state roll angle $\phi_\infty$ to thereby compute a compensating value $\phi_\infty$ for roll angle control; to compute an amendment value $\phi_x$ for roll angle control in accordance with the rate of change of steering angle as determined by said steering angle change rate detecting means; to compute a difference $\hat{\phi}$ based upon a desired roll angle $\phi_a$ of said vehicle body, said compensating value $\phi_\infty$, said amendment value $\phi_x$, and said actual roll angle $\phi_t$ following the equation:

$$\hat{\phi} = \phi_a - (k1\phi_\infty + k2\phi_t + k3\phi_x)$$

where k1, k2 and k3 are positive constants; and to control said plurality of actuator assemblies, via said plurality of control means, in accordance with said differences $\hat{\phi}$, when the absolute value of said difference $\hat{\phi}$ is larger than a predetermined value.

2. A system for vehicle roll control according to claim 1, wherein said computing and control means comprises a memory means, and said memory means stores a relationship between vehicle speeds, steering angles, and steady state roll angles.

3. A system for vehicle roll control according to claim 1, wherein said rate of change of said steering angle of the vehicle is steering velocity, and said steering angle change rate detecting means comprises said steering angle detecting means and a computing means for time differentiating the steering angle as sensed by said steering angle detecting means to thereby compute the steering velocity.

4. A system for vehicle roll control according to claim 1, wherein said rate of change of said steering angle of the vehicle is steering angular velocity, and said steering angle change rate detecting means comprises a means for sensing the steering angular velocity.

5. A system for vehicle roll control according to any one of claims 1 through 4, wherein said means for detecting the actual roll angle of said vehicle body comprises a plurality of vehicle height detecting means each corresponding to one of said vehicle wheels and serving for sensing a parameter representative of a height of the vehicle body over said corresponding vehicle wheel, said computing and control means being adapted to compute both a roll angle $\phi_f$ of said vehicle body with respect to front vehicle wheels and also a roll angle $\phi_r$ of said vehicle body with respect to rear vehicle wheels from vehicle height differences between left and right sides of said vehicle body based upon the vehicle heights sensed by said vehicle height detecting means and the distances between the left and the right vehicle wheels, and to compute as the actual roll angle $\phi_t$ based on the average of these two roll angles $\phi_f$ and $\phi_r$.

6. A system for vehicle roll control according to claim 5, wherein said computing and control means is adapted to perform the controlling of hardness and softness characteristics of a suspension means individually for the front vehicle wheels and for the rear vehicle wheels, based upon said two roll angles $\phi_f$ and $\phi_r$.

7. A system for vehicle roll control according to any one of claims 1 through claim 4, wherein said computing and control means is adapted to consider said amendment value $\phi_x$ as zero when said rate of change of the steering angle of the vehicle is less than a predetermined value.

8. For a vehicle comprising a body and a plurality of wheels upon which said vehicle runs, a vehicle roll control system of vehicle height adjustment type, comprising:
    a plurality of actuator assemblies, each corresponding to one of said vehicle wheels and resiliently suspending said corresponding vehicle wheel from the vehicle body, each one of said actuator assemblies being adapted to increase or decrease vehicle height at a location corresponding to said corresponding vehicle wheel in accordance with control signals supplied thereto;

a plurality of control means, each corresponding to one of said actuator assemblies and serving to supply control signals to said corresponding actuator assembly;

a plurality of vehicle height detecting means, each corresponding to one of said vehicle wheels and serving for sensing a parameter Hi representative of the height of the vehicle body over said corresponding vehicle wheel;

a vehicle speed detecting means for sensing a road speed of the vehicle;

a steering angle detecting means for sensing a steering angle of the vehicle;

a steering angle change rate detecting means for detecting the rate of change of said steering angle of the vehicle;

a means for detecting an actual roll angle $\phi_t$ of the body of the vehicle; and a means for computing and control adapted to compute the differences $\Delta Hi$ between the actual vehicle wheel heights over said vehicle wheels as sensed by said plurality of vehicle height detecting means and reference vehicle heights; to compute a steady state roll angle $\phi_\infty$ of the vehicle body based upon the vehicle speed sensed by said vehicle speed detecting means and the steering angle sensed by said steering angle detecting means; to advance a phase of a signal representative of said steady state roll angle $\phi_\infty$ to thereby compute a compensating value $\phi_\infty$ for roll angle control; to compute an amendment value $\phi_x$ for roll angle control in accordance with the rate of change of steering angle as determined by said steering angle change rate detecting means; to compute a difference $\hat{\phi}$ based upon a desired roll angle $\phi_a$ of said vehicle body, said compensating value $\phi_\infty$, said amendment value $\phi_x$, and said actual roll angle $\phi_t$ following the equation:

$$\hat{\phi} = \phi_a - (k1\phi_\infty + k2\phi_t + k3\phi_x)$$

where k1, k2 and k3 are positive constants; and, when the absolute value of said difference $\hat{\phi}$ is larger than a predetermined value, to control said plurality of actuator assemblies, via said plurality of control means, in accordance with said difference $\hat{\phi}$; while said computing and control means, when the absolute value of said difference $\hat{\phi}$ is less than said predetermined value, controls said plurality of actuator assemblies, via said plurality of control means, in accordance with said vehicle height differences $\Delta Hi$, so as to keep said vehicle height differences $\Delta Hi$ within determinate ranges.

9. A system for vehicle roll control according to claim 8, wherein said computing and control means comprises a memory means, and said memory means stores a relationship between vehicle speeds, steering angles, and steady state rolling angles.

10. A system for vehicle roll control according to claim 8, wherein said rate of change of said steering angle of the vehicle is steering velocity, and said steering angle change rate detecting means comprises said steering angle detecting means and a computing means for time differentiating the steering angle as sensed by said steering angle detecting means to thereby compute the steering velocity.

11. A system for vehicle roll control according to claim 8, wherein said rate of change of said steering angle of the vehicle is steering angular velocity, and said steering angle change rate detecting means comprises a means for sensing the steering angular velocity.

12. A system for vehicle roll control according to any one of claims 8 through claim 11, wherein said means for detecting the actual roll angle of said vehicle body comprises said plurality of vehicle height detecting means, said computing and control means being adapted to compute both a roll angle $\phi_f$ of said vehicle body with respect to front vehicle wheels and also a roll angle of $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as the actual roll angle $\phi_t$ based on the average of these two roll angles $\phi_f$ and $\phi_r$.

13. A system for vehicle roll control according to claim 12, wherein said computing and control means is adapted to perform the controlling of hardness and softness characteristics of suspension means individually for the case of the front vehicle wheels and for the rear vehicle wheels, based upon said two roll angles $\phi_f$ and $\phi_r$.

14. A system for vehicle roll control according to any one of claims 8 through 11, wherein said computing and control means is adapted to consider said amendment value $\phi_x$ as zero when said rate of change of the steering angle of the vehicle is less than a predetermined value.

* * * * *